(12) United States Patent
Sigelakis

(10) Patent No.: US 10,099,079 B2
(45) Date of Patent: Oct. 16, 2018

(54) FIRE HYDRANT OPERATING NUT AND METHOD FOR LUBRICATING THE OPERATING NUT

(71) Applicant: Sigelock Systems, LLC, Oceanside, NY (US)

(72) Inventor: George Sigelakis, Oceanside, NY (US)

(73) Assignee: Sigelock Systems, LLC, Oceanside, NY (US)

(*) Notice: Subject to any disclaimer, the term of this patent is extended or adjusted under 35 U.S.C. 154(b) by 36 days.

(21) Appl. No.: 14/802,698

(22) Filed: Jul. 17, 2015

(65) Prior Publication Data

US 2016/0038776 A1 Feb. 11, 2016

Related U.S. Application Data

(60) Continuation of application No. 14/167,804, filed on Jan. 29, 2014, now Pat. No. 9,103,101, which is a division of application No. 12/787,328, filed on May 25, 2010, now Pat. No. 8,640,728, said application No. 14/802,698 is a continuation of application No.
(Continued)

(51) Int. Cl.
| | | |
|---|---|---|
| *E03B 9/02* | (2006.01) | |
| *A62C 35/20* | (2006.01) | |
| *E03B 9/08* | (2006.01) | |
| *E03B 9/14* | (2006.01) | |
| *E03B 9/06* | (2006.01) | |
| *F16K 25/00* | (2006.01) | |

(52) U.S. Cl.
CPC ............ *A62C 35/20* (2013.01); *E03B 9/06* (2013.01); *E03B 9/08* (2013.01); *E03B 9/14* (2013.01); *F16K 25/005* (2013.01); *Y10T 137/0318* (2015.04); *Y10T 137/5392* (2015.04); *Y10T 137/5468* (2015.04); *Y10T 137/5479* (2015.04); *Y10T 137/5497* (2015.04); *Y10T 137/5503* (2015.04); *Y10T 137/5515* (2015.04); *Y10T 137/5532* (2015.04); *Y10T 137/8593* (2015.04)

(58) Field of Classification Search
CPC ......... Y10T 137/5327; Y10T 137/5438; Y10T 137/5479
USPC ....................................... 251/355
See application file for complete search history.

(56) References Cited

U.S. PATENT DOCUMENTS

| | | | | |
|---|---|---|---|---|
| 2,018,454 A | * | 10/1935 | Lofton | E03B 9/02 137/298 |
| 2,032,881 A | * | 3/1936 | Lofton | E03B 9/02 137/298 |

(Continued)

*Primary Examiner* — R. K. Arundale
(74) *Attorney, Agent, or Firm* — Martine Penilla Group, LLP

(57) ABSTRACT

A method for delivering water through a fire hydrant is disclosed and includes unlocking a sprinkler cap control lock on the fire hydrant, removing the sprinkler cap control lock to access an operating nut of the fire hydrant and activating the operating nut to deliver water through a plurality of sprinkler ports in at least one of a plurality of caps on the fire hydrant. Also disclosed are fire hydrant with a lubricant channel and a method of lubricating a fire hydrant operation nut. Also disclosed is a fire hydrant that does not need a lubricant disposed between the operation nut and the fire hydrant body due to an operating nut sleeve being disposed between the operation nut and the fire hydrant body.

21 Claims, 41 Drawing Sheets

Related U.S. Application Data

13/163,627, filed on Jun. 17, 2011, now Pat. No. 9,108,076.

(60) Provisional application No. 61/356,427, filed on Jun. 18, 2010.

(56) References Cited

U.S. PATENT DOCUMENTS

| | | | | | |
|---|---|---|---|---|---|
| 2,100,862 | A | * | 11/1937 | Lofton | E03B 9/02 137/298 |
| 2,576,631 | A | * | 11/1951 | Mueller | E03B 9/02 137/296 |
| 3,294,109 | A | * | 12/1966 | Smith | E03B 9/04 137/298 |
| 3,586,019 | A | * | 6/1971 | Thomas | E03B 9/04 137/307 |
| 4,083,377 | A | * | 4/1978 | Luckenbill | E03B 9/04 137/296 |
| 4,154,259 | A | * | 5/1979 | Ellis | E03B 9/04 137/298 |
| 4,560,144 | A | * | 12/1985 | Williams | F16L 41/16 137/315.07 |
| 4,791,952 | A | * | 12/1988 | Laurel | E03B 9/04 137/15.02 |
| 6,698,447 | B1 | * | 3/2004 | Cline | E03B 9/02 137/272 |

\* cited by examiner

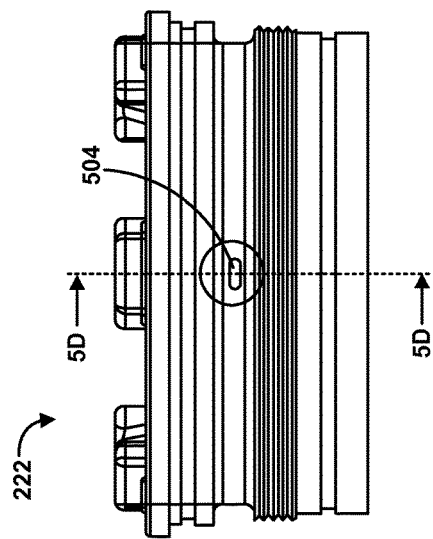
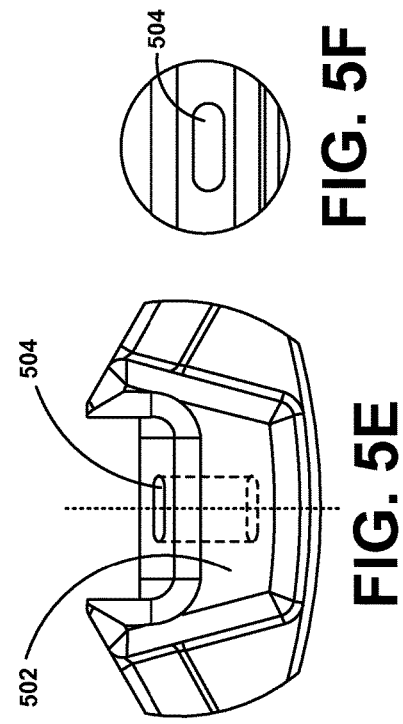
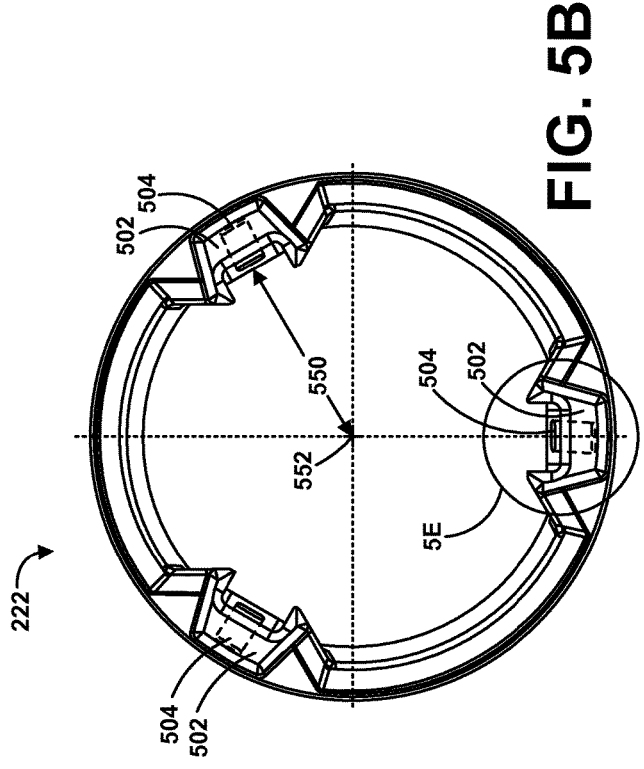
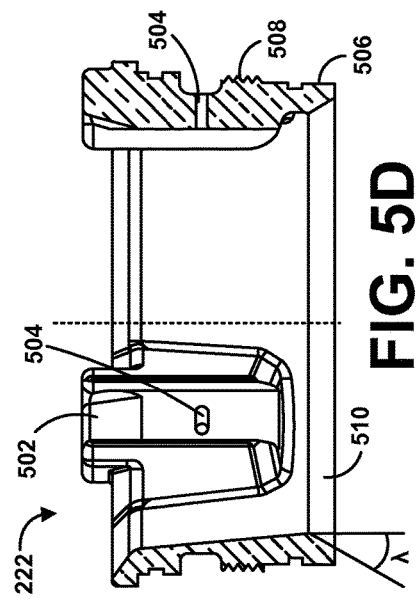
FIG. 5C
FIG. 5F
FIG. 5B
FIG. 5E
FIG. 5D

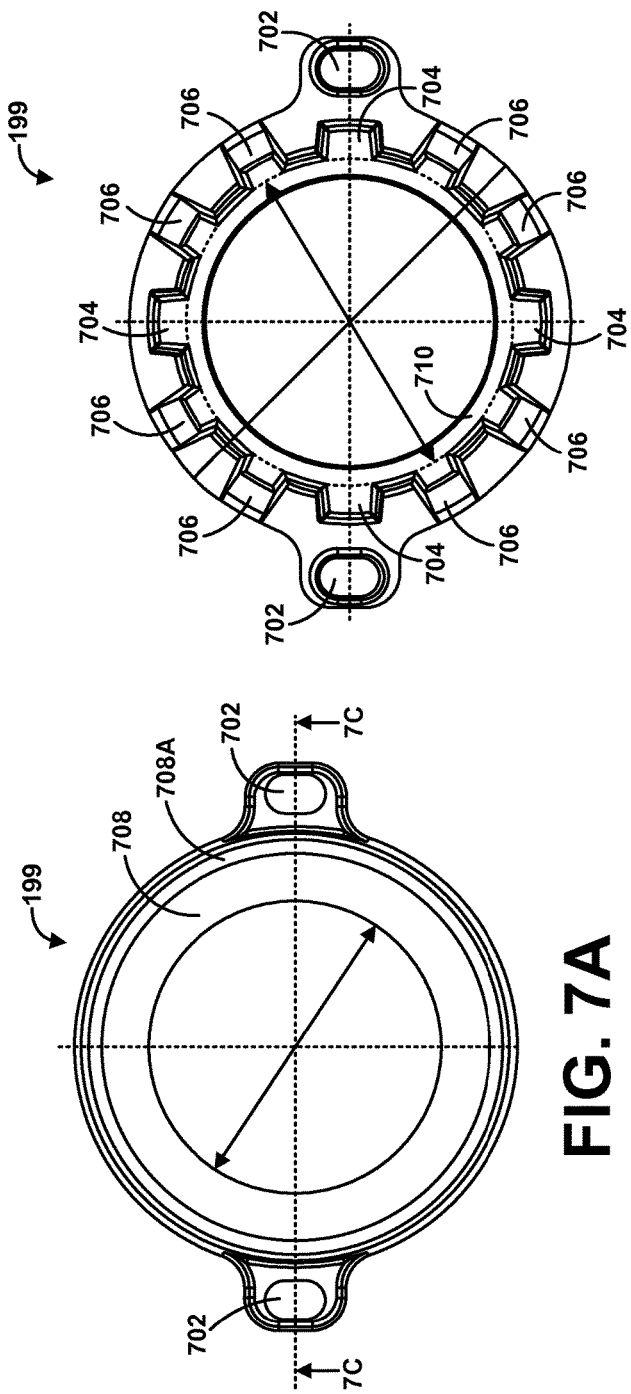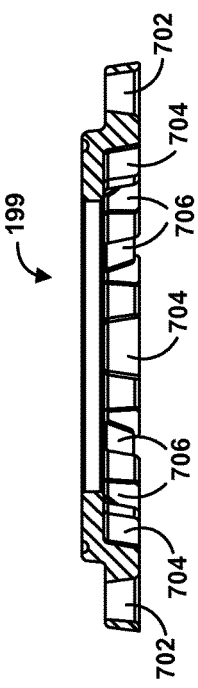

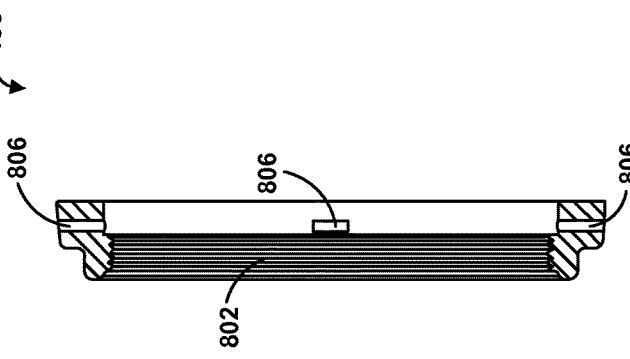
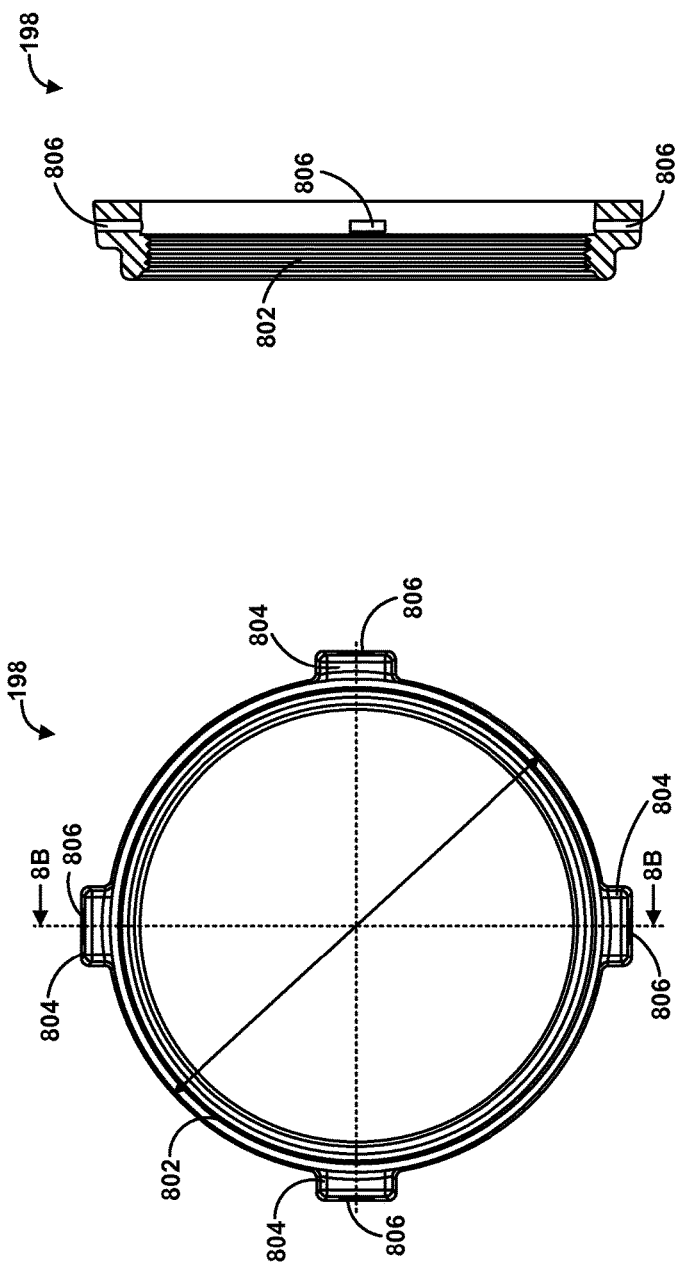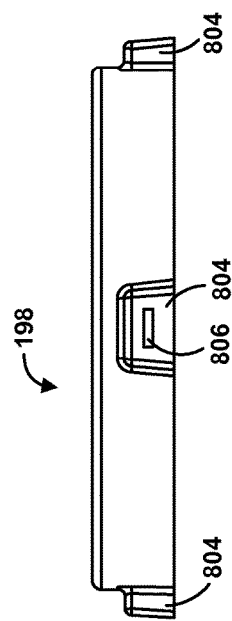

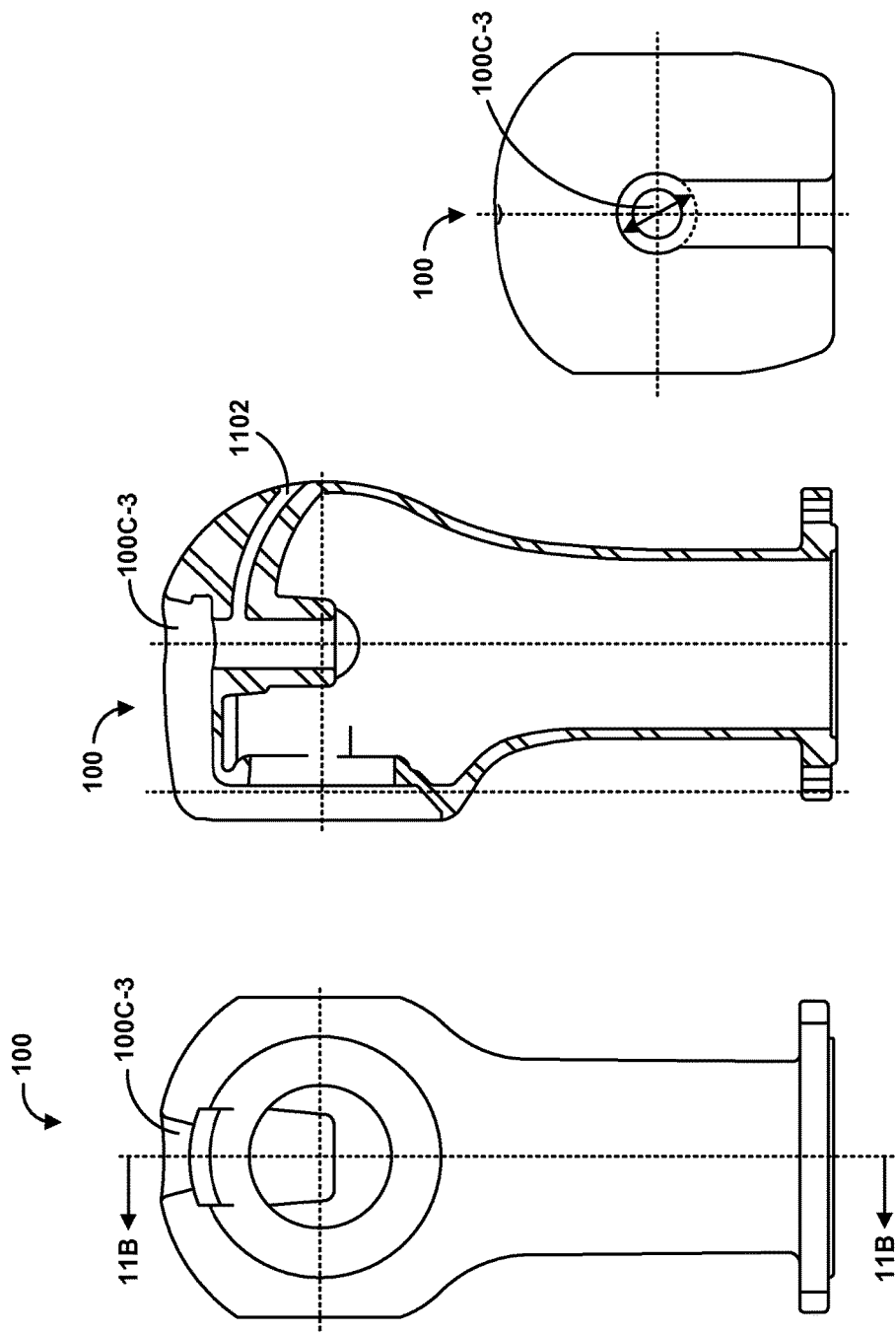

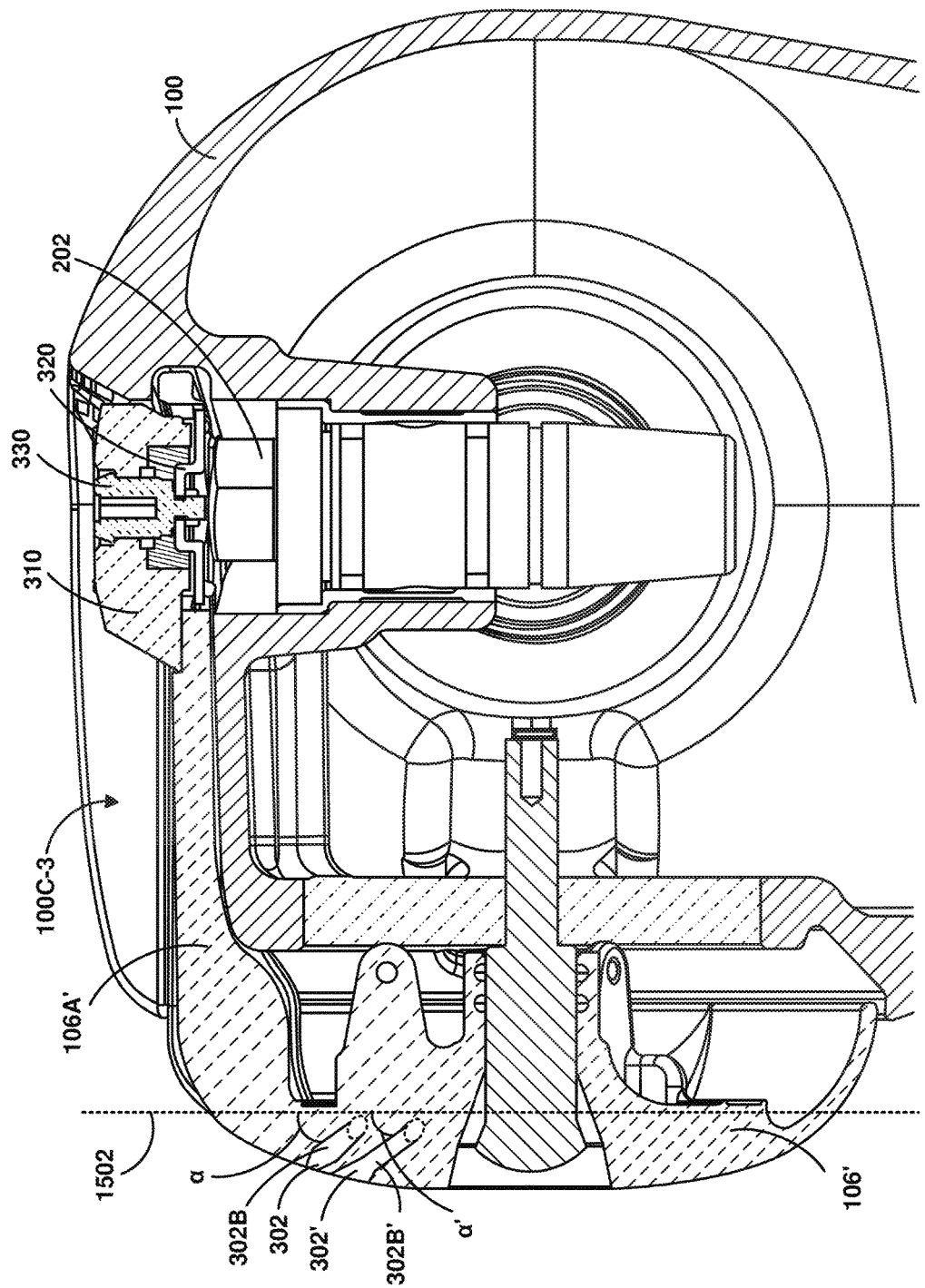

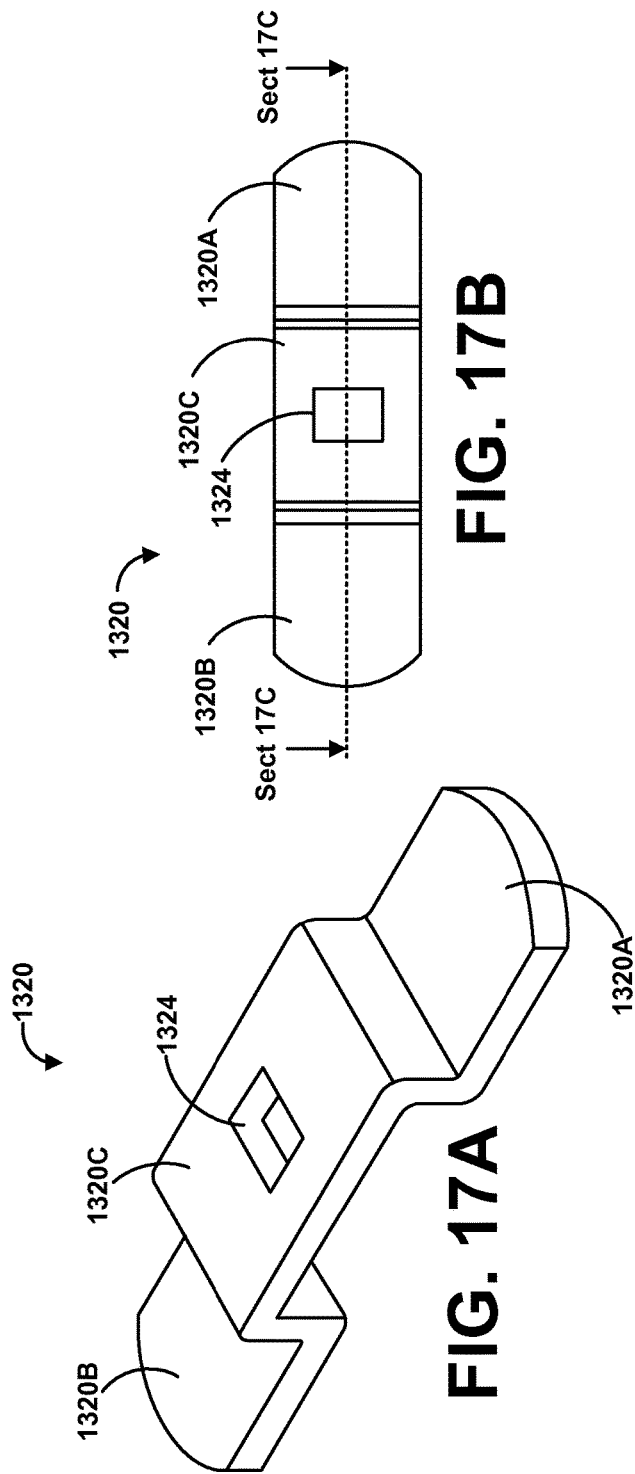
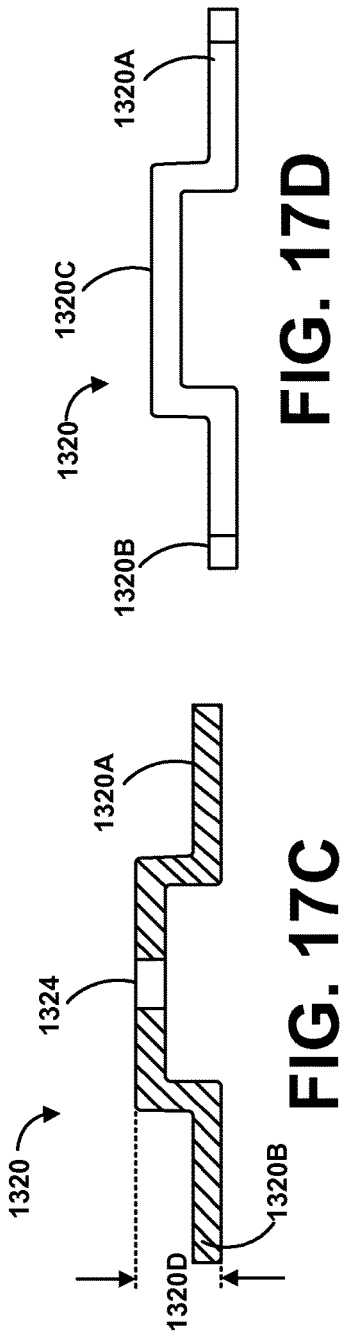
FIG. 17A
FIG. 17B
FIG. 17C
FIG. 17D

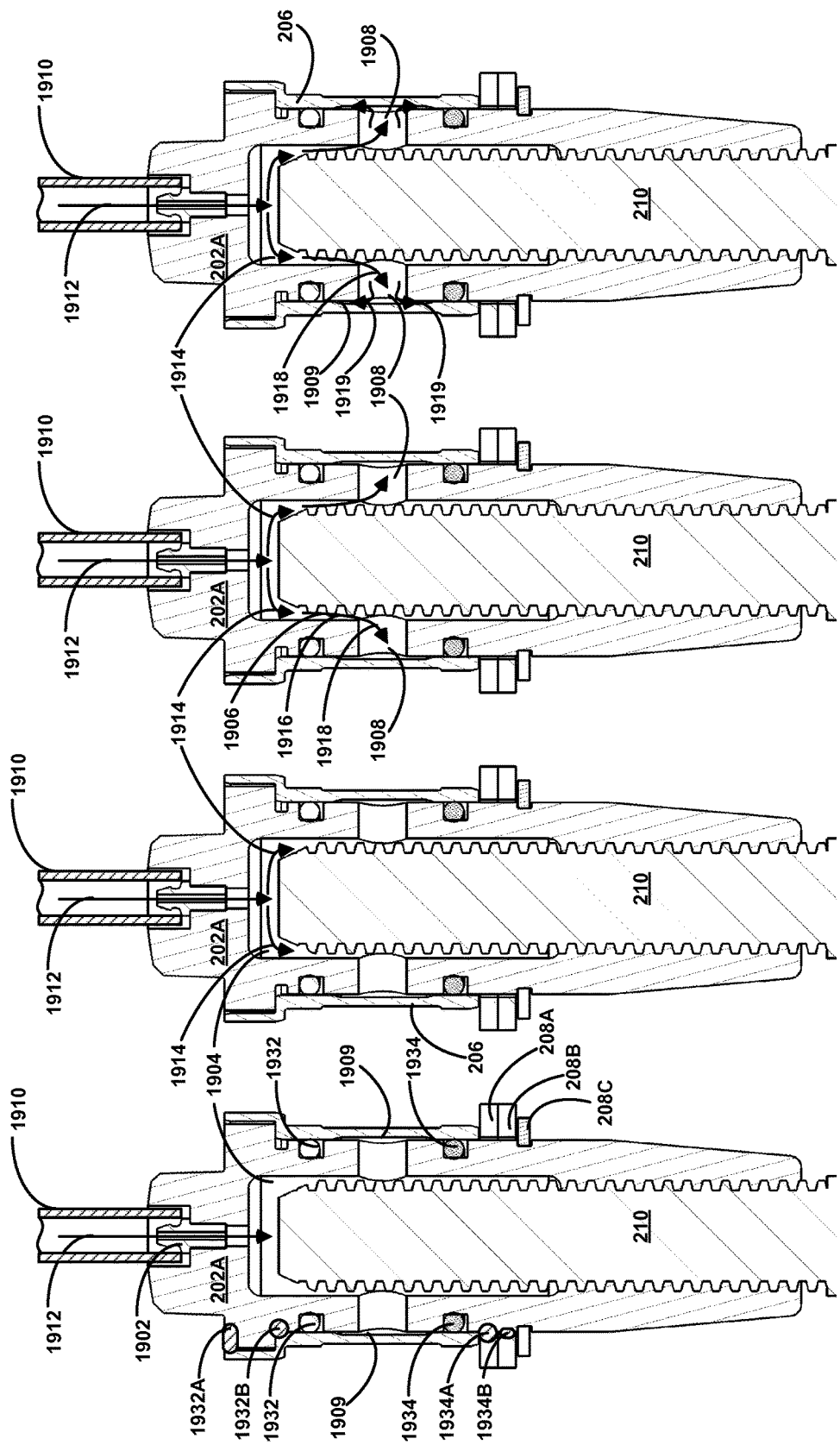

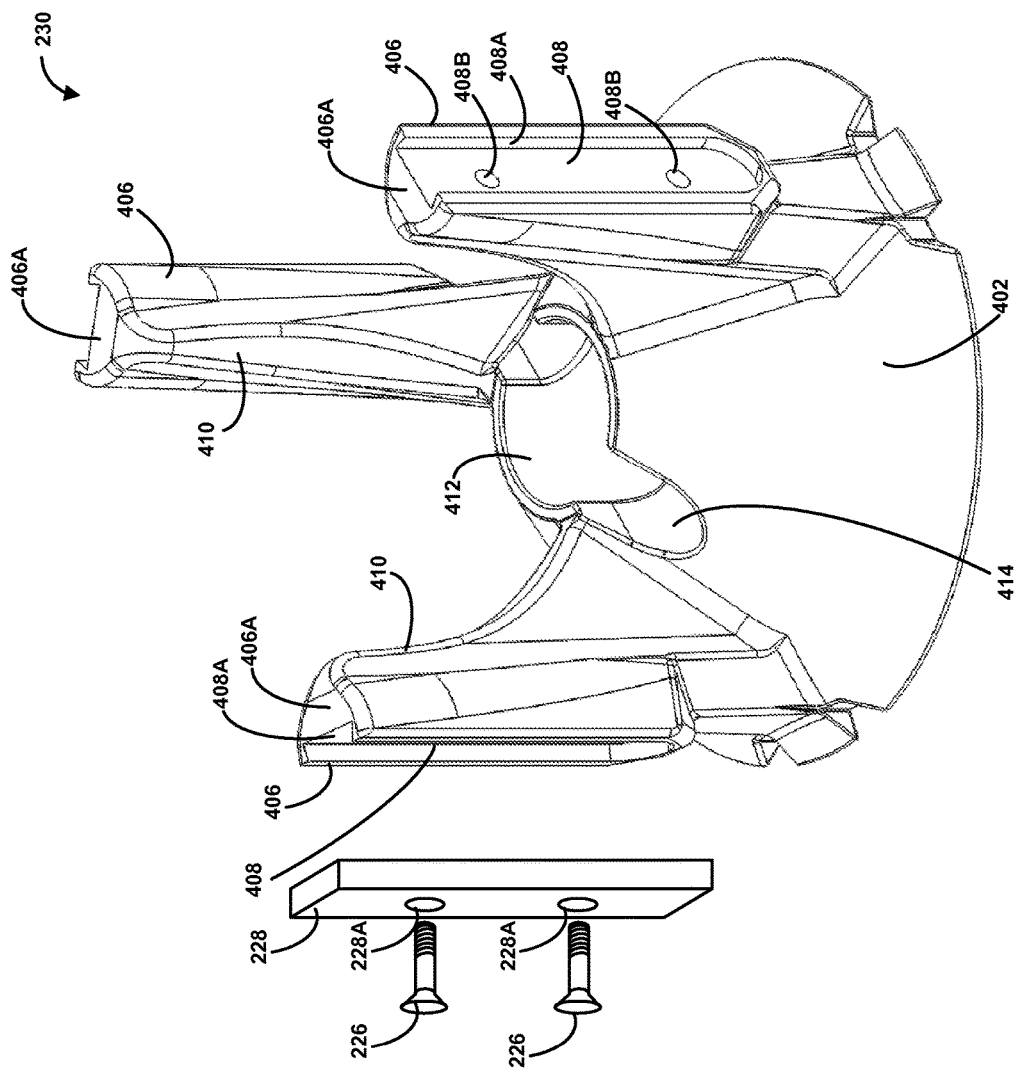

FIRE HYDRANT OPERATING NUT AND METHOD FOR LUBRICATING THE OPERATING NUT

This application is also a continuation of and claims priority from co-pending U.S. patent application Ser. No. 14/167,804 filed on Jan. 29, 2014 and entitled "Fire Hydrant Control Valve," which is incorporated herein by reference in its entirety for all purposes. This application is also a continuation of and claims priority through, U.S. patent application Ser. No. 14/167,804, from U.S. Pat. No. 8,640,728, filed on May 25, 2010 and issued on Feb. 4, 2014 and entitled "Fire Hydrant Control Valve," which is incorporated herein by reference in its entirety for all purposes. This application is also a continuation of and claims priority from co-pending U.S. patent application Ser. No. 13/163,627 filed on Jun. 17, 2011 and entitled "Fire Hydrant Locking Sprinkler Cap, Hydrant Valve Seals and Lubrication Access," which is incorporated herein by reference in its entirety for all purposes. This application also claims priority from U.S. Provisional Patent Application No. 61/356,427 filed on Jun. 18, 2010 and entitled "Fire Hydrant Locking Sprinkler Cap," which is incorporated herein by reference in its entirety for all purposes.

BACKGROUND

The present invention relates generally to fire hydrants and, more particularly, to a control valve, sprinkler cap, seals, locking mechanisms and component materials for a fire hydrant.

Firefighters need quick and reliable access to water to fight fires safely and effectively. Typical fire hydrants are susceptible to jamming and blockage of the control valve. Jamming and blockage of the control valve prevents firefighters from accessing water via the fire hydrant. The control valve can be jammed or blocked due to insufficient drainage of the first hydrant. The control valve can also be jammed or blocked due to intrusion of tree roots into the control valve.

In view of the foregoing, there is a need for a fire hydrant that has a control valve that is less prone to being jammed and blocked.

SUMMARY

Broadly speaking, the present invention fills this need by providing a method for delivering water through a fire hydrant is disclosed and includes unlocking a sprinkler cap control lock on the fire hydrant, removing the sprinkler cap control lock to access an operating nut of the fire hydrant and activating the operating nut to deliver water through a plurality of sprinkler ports in at least one of a plurality of caps on the fire hydrant. Also disclosed are fire hydrant with a lubricant channel and a method of lubricating a fire hydrant operation nut. Also disclosed is a fire hydrant that does not need a lubricant disposed between the operation nut and the fire hydrant body due to an operating nut sleeve being disposed between the operation nut and the fire hydrant body.

It is to be understood that the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate exemplary embodiments and together with the description serve to explain the principles of the invention, as claimed.

FIGS. 5A-5G show different views of the valve seat ring, in accordance with one embodiment of the invention.

FIGS. 7A-7C show different views of the saturation ring, in accordance with one embodiment of the invention.

FIGS. 8A-8C show different views of the drain ring, in accordance with one embodiment of the invention.

FIGS. 11A-11C show different views of the fire hydrant body, in accordance with one embodiment of the invention.

FIGS. 15A and 15B show a sectional view of the sprinkler cap, in accordance with embodiments of the present invention.

FIGS. 17A-17D are detailed views of the double-sided cam, in accordance with embodiments of the present invention.

FIGS. 19C through 19F are detailed cross-sectional views of the operating nut, in accordance with embodiments of the present invention.

FIG. 21 is a perspective view of the valve top plate, in accordance with embodiments of the invention.

DETAILED DESCRIPTION

Several exemplary embodiments will now be described in detail with reference to the accompanying drawings.

Figure 1:
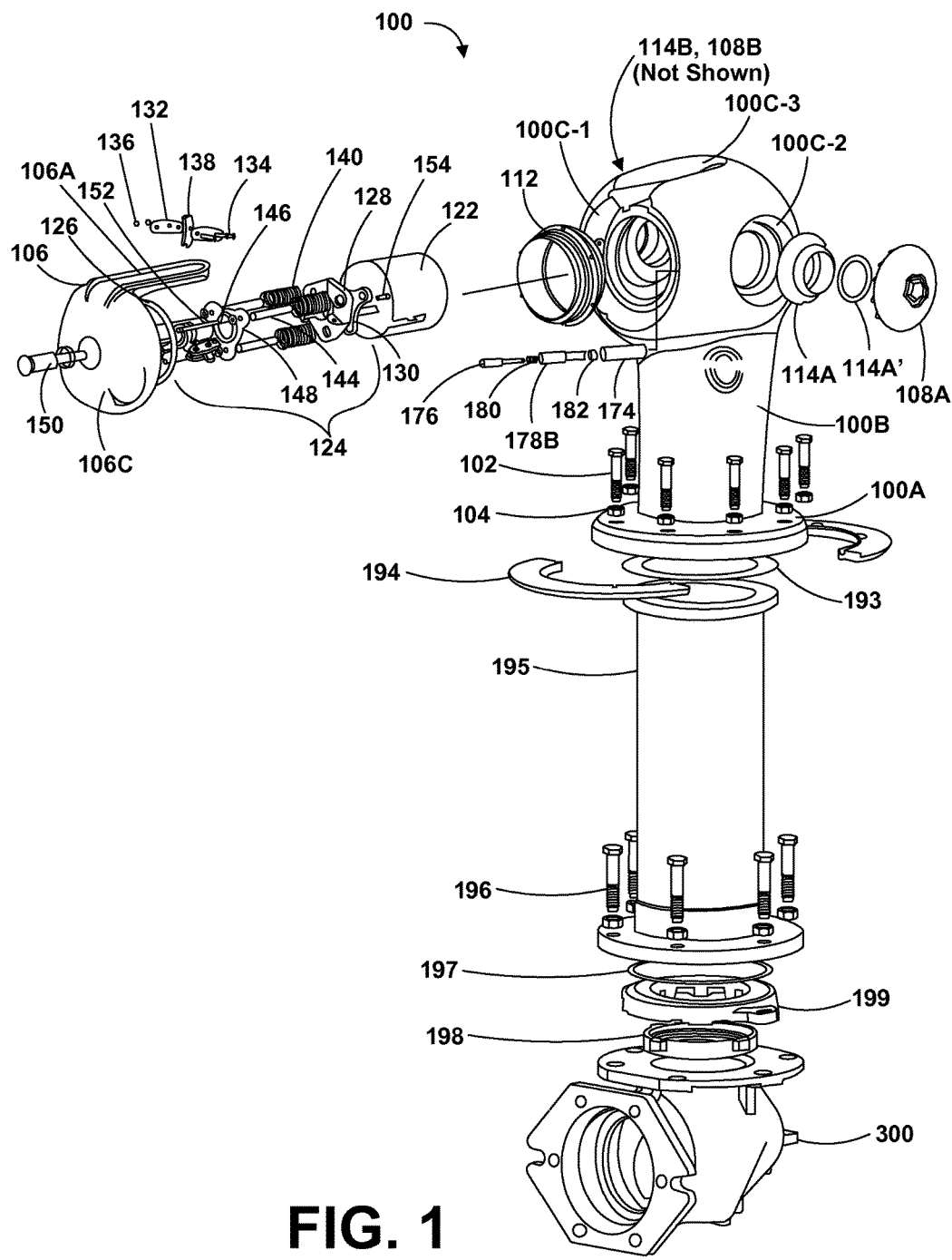
FIG. 1 is an exploded view of the components of a locking fire hydrant, standpipe and inlet elbow, in accordance with one embodiment of the invention.

FIG. 1 is an exploded view of the components of a locking fire hydrant, standpipe and inlet elbow, in accordance with embodiments of the invention. As shown in FIG. 1, the locking fire hydrant includes a fire hydrant body 100, which is fastened to a standpipe 195 by bolts 102 and nuts 104. Locking cap 106 is mounted on fire hydrant body 100 to close off a main outlet port 112 defined in the fire hydrant body. Side caps 108A and 108B are mounted on fire hydrant body 100 to close off respective auxiliary side outlet ports 114A and 114B defined in the fire hydrant body. As used herein, the terms "side cap" and "auxiliary cap" are used interchangeably to refer to the cap used to close off an auxiliary outlet port defined in the fire hydrant body, i.e., any outlet port other than the main outlet port. Plunger assemblies 110A and 110B are provided in internal channels formed in fire hydrant body 100 on opposite sides of the main outlet port 112 defined in the fire hydrant body. When locking cap 106 is mounted on fire hydrant body 100, plunger assemblies 110A and 110B are actuated so that plungers extend into the recessed areas that surround the side outlet ports 114A and 114B defined in fire hydrant body 100. The plungers 110A and 110B interface with ratchet teeth formed on the back side of side caps 108A and 108B.

Also as shown in FIG. 1, fire hydrant body 100 includes flange 100A, neck 100B, and head 100C. Flange 100A has a plurality of holes formed therethrough and these holes are used to fasten the flange to a safety flange 194 using bolts 102 and nuts 104. The safety flange 194 captures seal 193 between the standpipe 195 and the flange 100A. As shown in FIG. 1, flange 100A is a generally circular flange that extends from the lower portion of neck 100B; however, it will be apparent to those skilled in the art that the configuration of the flange may be varied to meet the needs of particular situations. Fire hydrant body 100, as well as the other components of the locking fire hydrant described below, may be made of any suitable material, e.g., stainless steel, iron, ductile iron, brass, bronze, stainless steel, plastics, and composite materials and combinations thereof.

The standpipe 195 is coupled to the inlet elbow 300 using bolts 196. A saturation ring 199, a drain ring 198 and an inlet flange seal 197 are captured between the inlet flange on the standpipe 195 and the inlet elbow 300. The saturation ring 199 and the drain ring 198 are described in more detail below.

Head 100C defines a hollow interior and has a generally rounded outer configuration that includes a number of recessed portions that are configured to protect components mounted thereon. In particular, head 100C includes main cap recess 100C-1, side cap recess 100C-2, and valve access channel 100C-3. Main cap recess 100C-1 surrounds cylinder 112, which has an inner surface and an outer surface. The inner surface of cylinder 112 defines a main outlet port of head 100C and the outer surface is threaded so that a complementarily threaded coupling member of a fire hose can be fastened thereon, as is well known to those skilled in the art.

Side cap recesses 100C-2 surround cylinders 114A and 114B, each of which has an inner surface and an outer surface. The respective inner surfaces define auxiliary side outlet ports of head 100C and the respective outer surfaces are threaded so that either a complementarily threaded coupling member of a fire hose or a threaded side cap (e.g., side cap 108A) can be fastened thereon.

Valve access channel 100C-3 is formed in the upper portion of head 100C and is configured to receive tongue 106A that extends from cap body 106C of locking cap 106. The tongue 106A prevents access to valve control device 200 (described in more detail below with reference to FIG. 2) disposed within fire hydrant body 100 when the locking cap 106 is secured to the head 100C. Additional details of the fire hydrant body 100 are explained in more detail in co-owned, co-pending U.S. application Ser. No. 12/482,366, filed on Jun. 10, 2009 and entitled "Locking Fire Hydrant" the disclosure of which is incorporated herein by reference in its entirety for all purposes. Additional details regarding a fire hydrant body that is configured to protect a locking cap from being tampered with by unauthorized users are set forth in U.S. Pat. No. 6,688,326 B1, the disclosure of which is incorporated herein by reference in its entirety for all purposes.

The locking mechanism 124 is surrounded by an optional lock cover 122, which has a generally cylindrical configuration. Lock cover 122 is provided to minimize the degree to which the locking mechanism is exposed to potentially harmful elements, e.g., dirt, foreign objects, etc. Lock cover 122 can be made from any suitable material. By way of example, lock cover 122 can be made of stainless steel or plastic. Gasket 126 is provided on the inner surface of locking cap 106 to provide a seal around the main outlet port when the locking cap is mounted on fire hydrant body 100.

The locking mechanism 124 includes top plate 128, which has a central hole and three peripheral holes formed therethrough. The outer surface of top plate 128 is configured to receive spring support 130, and the inner surface of the top plate is provided with three mounting anchors. Three pairs of support arms 132 connect top plate 128 to the inner surface of locking cap 106. Each support arm 132 has three holes formed therethrough. One end of each support arm 132 is fastened to one of the mounting anchors on the inner surface of top plate, and the opposite end of each support arm is fastened to one of mounting anchors 106C provided on the inner surface of locking cap 106. Support arms 132 are fastened using bolts 134 and hex nuts 136; however, it will be apparent to those skilled in the art that other suitable fasteners can be used. A cam gear 138 is rotatably fastened between each pair of support arms 132. Each cam gear 138 has a cam surface at one end thereof and a set of gear teeth at the opposite end thereof.

Three springs 140 are disposed between top plate 128 and cap plate 142, which has a central hole formed therethrough. In one embodiment, springs 140 are heavy duty die springs (at least about 2,500 pounds total spring pressure); however, it will be apparent to those skilled in the art that any suitable springs can be used. Each spring 140 is disposed on a spring shaft 144, which has a hollow interior that receives a screw 146. Each screw 146 is threaded into spring support 130. Washers 148 are disposed between the head of each screw 146 and the outer surface of cap plate 142.

Actuator pin 150 extends through a central aperture defined in locking cap 106. Rack 152 has a generally cylindrical configuration and a hollow interior and receives extension portion of actuator pin 150. The outer surface of rack 152 is provided with a number of cylindrical gears, which are configured to mate with the gear teeth provided at one end of each of cam gears 138.

To enable locking mechanism 124 to operate when lock cover 122 is in place, slots are provided in the locking cover. Each slot is located so that the cam surface of a cam gear 138 can extend therethrough and interface with a mating surface inside the fire hydrant body to lock and unlock locking mechanism 124.

Figure 2:
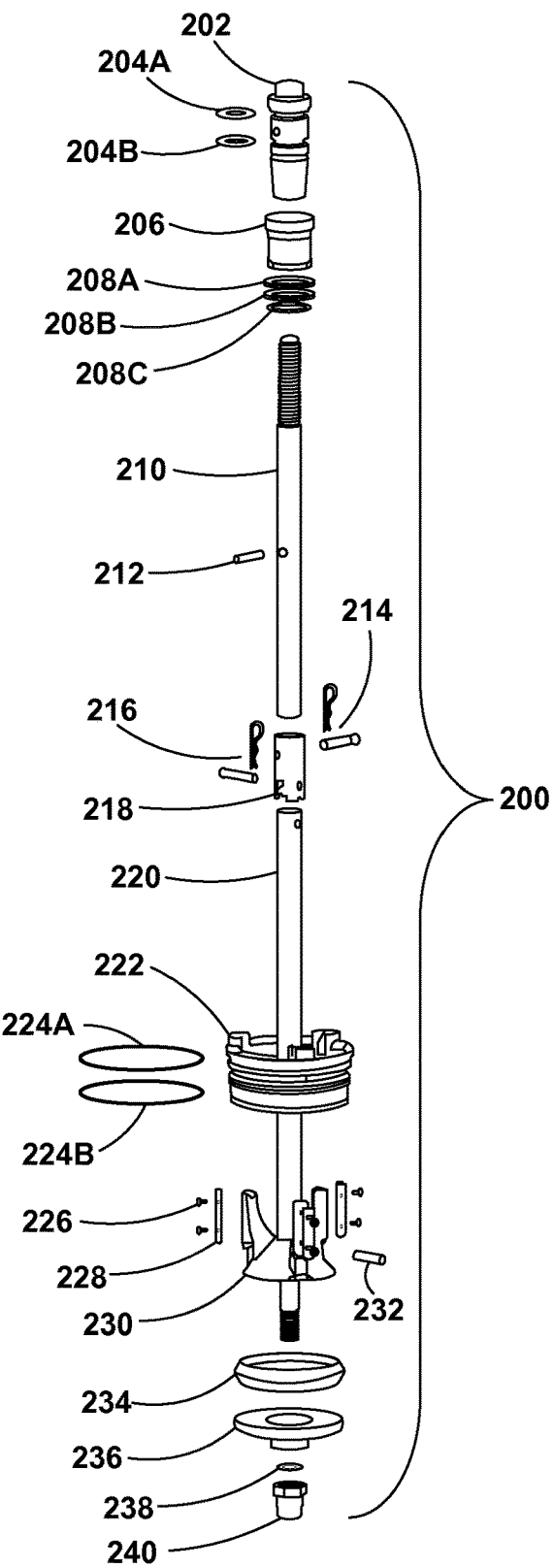
FIG. 2 is an exploded view of the components of a valve control device 200, in accordance with one embodiment of the invention.

FIG. 2 is an exploded view of the components of a valve control device 200, in accordance with embodiments of the invention. The valve control device 200 includes an operating nut 202, seals 204A, 204B, operating nut sleeve 206, thrust washers 208A, 208B, and retaining ring 208C. The seals 204A, 204B provide a substantially water tight seal between the operating nut 202 and the valve access channel 100C-3 in the head 100C (see FIG. 1). The operating nut 202 is attached to an upper operating stem 210. One or more stem grooved pins 212 are included in the upper operating stem 210. The upper operating stem 210 is coupled to a lower operating stem 220 by a safety coupling 218 and coupling pins and keys 214, 216. The lower operating stem 220 passes through a valve seat ring 222.

A tri-arm valve top plate 230 is mounted on the lower operating stem 220. The valve seat rubber 234 and the valve bottom plate 236 also are mounted on the lower operating stem 220. A bottom plate nut 240 and seal 238 secure the valve seat rubber 234 to the valve bottom plate 236 on the lower operating stem 220. The valve seat rubber 234 can be formed from any suitable material (e.g., rubber, plastic, nylon, acetal resin materials (e.g., Delrin), Teflon, polyethylene terephthalate (PET), ultra high molecular weight (UHMW) polyethylene, or other suitable materials and combinations thereof). The tri-arm valve top plate 230, the valve seat ring 222, and the valve bottom plate 236 are described in more detail below with reference to FIGS. 4A-4C, 5A-5F and 6A-6C. The operation of the valve control device 200 is described in more detail below with reference to FIGS. 9A-9D.

Figure 3A:
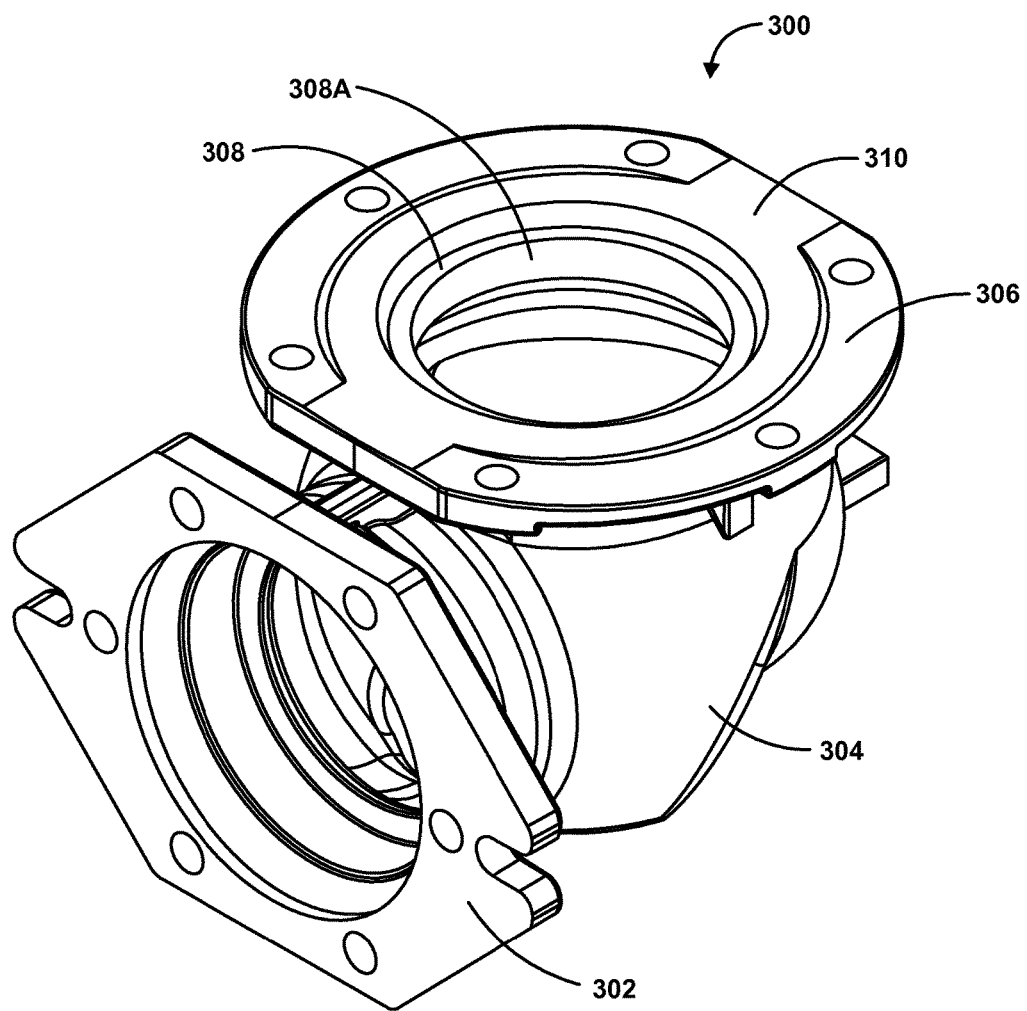
FIGS. 3A-3G show different views of the inlet elbow, in accordance with one embodiment of the invention.
Figure 3D:
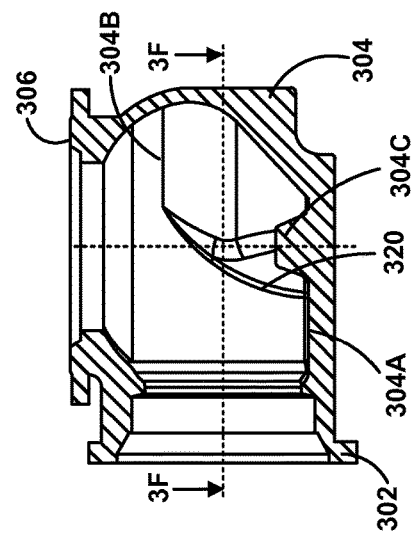
Figure 3G:
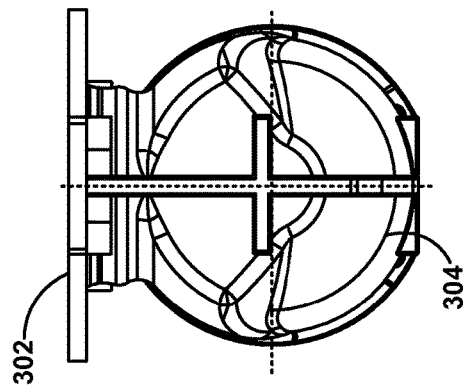
Figure 3C:
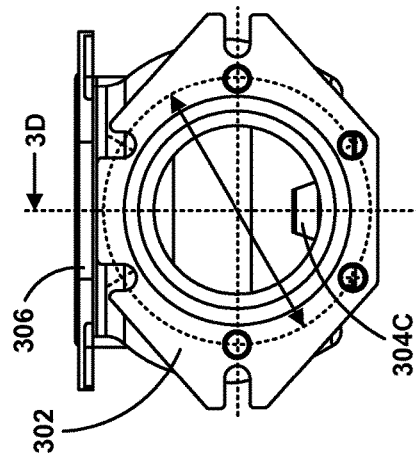
Figure 3F:
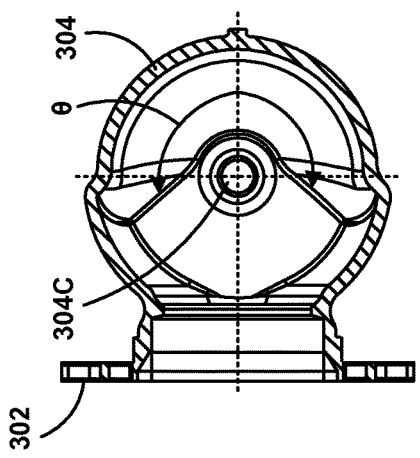
Figure 3B:
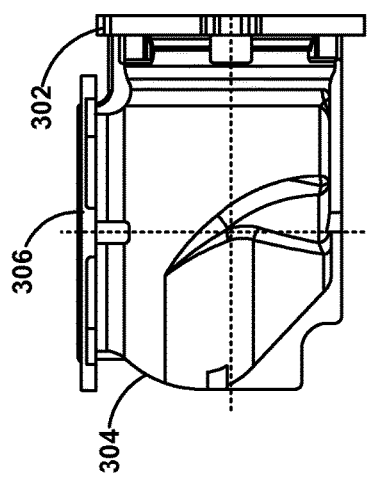
Figure 3E:
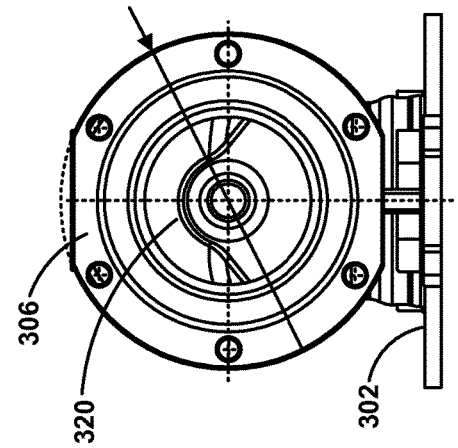

FIGS. 3A-3G show different views of the inlet elbow 300, in accordance with one embodiment of the invention. FIG. 3A is a perspective view of the inlet elbow 300, in accordance with one embodiment of the invention. FIG. 3B is a side view of the inlet elbow 300, in accordance with one embodiment of the invention. FIG. 3C is a front view of the inlet elbow 300, in accordance with one embodiment of the invention. FIG. 3D is a sectional view 3D-3D (see FIG. 3C) of the inlet elbow 300, in accordance with one embodiment of the invention. FIG. 3E is a top view of the inlet elbow 300, in accordance with one embodiment of the invention. FIG. 3F is a sectional view 3F-3F (see FIG. 3D) of the inlet elbow 300, in accordance with one embodiment of the invention. FIG. 3G is a bottom view of the inlet elbow 300, in accordance with one embodiment of the invention.

Referring now to FIG. 3A, the inlet elbow 300 includes a supply flange 302, an elbow body 304 and an outlet flange 306. The outlet flange 306 includes a drain ring recess 308 and a saturation ring seat 310. The drain ring 198 fits into the drain ring recess 308 and the saturation ring 199 fits over the drain ring and rests on the saturation ring seat 310. The operation of the drain ring 198, drain ring recess 308, saturation ring 199 and saturation ring seat 310 are described in more detail below with reference to FIGS. 9A-9D and 10A.

As shown in FIGS. 3D and 3E, the elbow body 304 has a contoured floor 320. The contoured floor 320 is raised and/or curved to improve the flow characteristics of the water flowing through the elbow body 304 and though the valve control device 200. The contoured floor 320 curves upward from the bottom inner surface 304A of the elbow body 304 to a plateau 304B that is below the valve control device 200 (FIG. 3D).

A protrusion 304C receives the bottom plate nut 240 and allows the valve control device 200 to descend downward into the elbow body 304 until the bottom plate 236 contacts the plateau 304B and/or the bottom plate nut contacts the protrusion. The plateau 304B spans an angle θ between about 270 degrees and about 120 degrees (see FIG. 3F). The floor 320 can be straight or curved between the bottom inner surface 304A to the plateau 304B. The floor 320 can be a combination of curved and/or flat surfaces between the bottom inner surface 304A to the plateau 304B.

Additional details of the fire hydrant 100 are described in co-pending, co-owned U.S. application Ser. No. 12/787,328, entitled "Fire Hydrant Control Valve" and filed on May 25, 2010, which is incorporated by reference herein, in its entirety for all purposes.

Figure 4A:
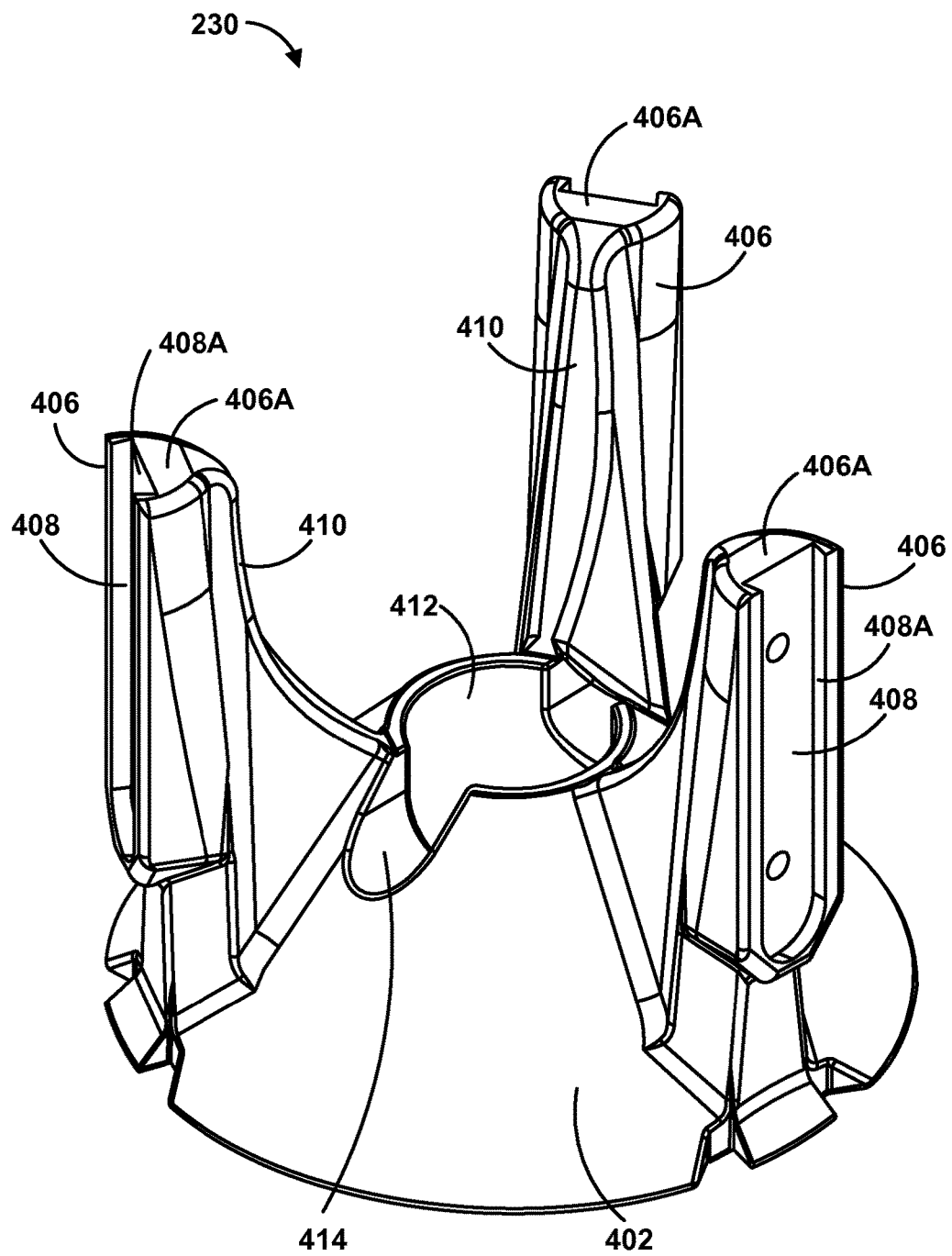
FIGS. 4A-4E show different views of the tri-arm valve top plate, in accordance with one embodiment of the invention.
Figure 4D:
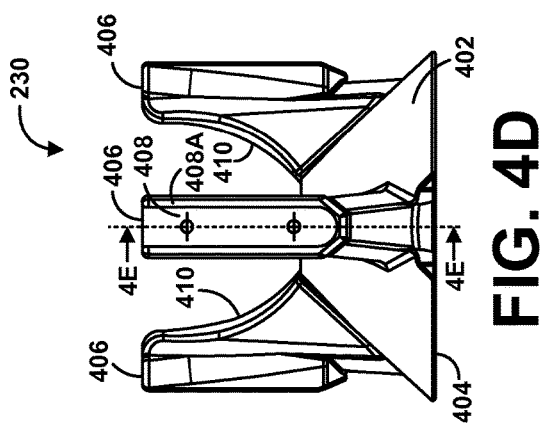
Figure 4C:
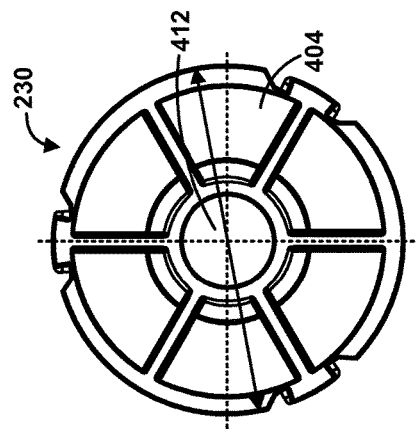
Figure 4E:
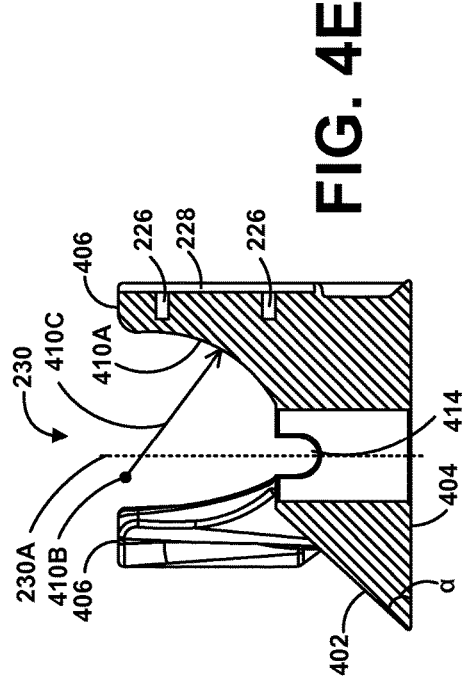
Figure 4B:
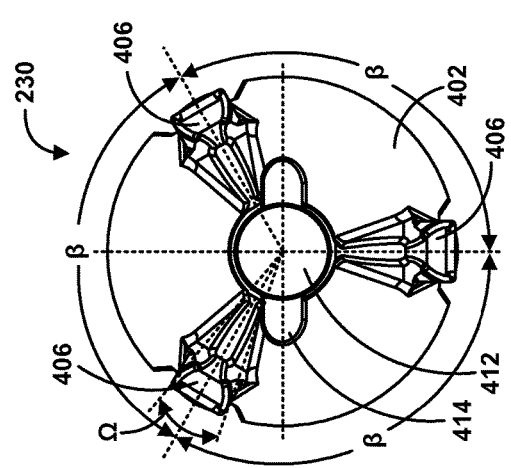

FIGS. 4A-4E show different views of the tri-arm valve top plate 230, in accordance with one embodiment of the invention. FIG. 4A is a perspective view of the tri-arm valve top plate 230, in accordance with one embodiment of the invention. FIG. 4B is a top view of the tri-arm valve top plate 230, in accordance with one embodiment of the invention. FIG. 4C is a bottom view of the tri-arm valve top plate 230, in accordance with one embodiment of the invention. FIG. 4D is a side view of the tri-arm valve top plate 230, in accordance with one embodiment of the invention. FIG. 4E is a sectional view 4E-4E (see FIG. 4D) of the tri-arm valve top plate 230, in accordance with one embodiment of the invention. The tri-arm valve top plate 230 has a substantially conical base 402 having an angle α of between about 20 degrees and about 60 degrees between the surface of the conical base and the substantially flat bottom surface 404 of the tri-arm valve top plate 230 (see FIG. 4E).

The tri-arm valve top plate 230 includes three substantially equally spaced stabilizer arms 406. The three stabilizer arms 406 can be spaced at angle ß of between about 90 degrees and about 135 degrees between the respective centerlines of the stabilizer arms (see FIG. 4B). It should be understood that while the tri-arm valve top plate 230 is shown and described with three stabilizer arms, more than three (e.g., four or five or more) stabilizer arms could be included.

The stabilizer arms 406 have a substantially flat outer surface 408. The outer surfaces 408 fit into slots 502 of the valve seat ring 222 as will be described in more detail below. Replaceable inserts 228 can be installed on the outer surfaces 408 of the stabilizer arms 406 (see FIG. 4E). The replaceable inserts 228 can be secured to the outer surfaces 408 with fasteners 226. The outer surfaces 408 can include recesses 408A that substantially surround the replaceable inserts 228 on one or more sides of the replaceable inserts.

The stabilizer arms 406 have a substantially triangular cross section shape having an inner angle Ω that is opposite to the outer surfaces 408 (see FIG. 4B). The inner angle Ω is between about 20 degrees and about 45 degrees.

The stabilizer arms 406 have an angled and/or tapered inner surface 410. The inner edge 410 extends from the conical base 402 to the ends 406A of each of the stabilizer arms. The inner edge 410 can have a curve of one or more radii and/or straight portions. The tri-arm valve top plate 230 includes a valve top central channel 412 in the center of the tri-arm valve top plate. The tri-arm valve top plate 230 also includes a stem pin groove 414. A stem pin 232 passes through the stem pin groove 414 and a stem bore in the lower operating stem 220 (see FIG. 2).

Figure 5A:
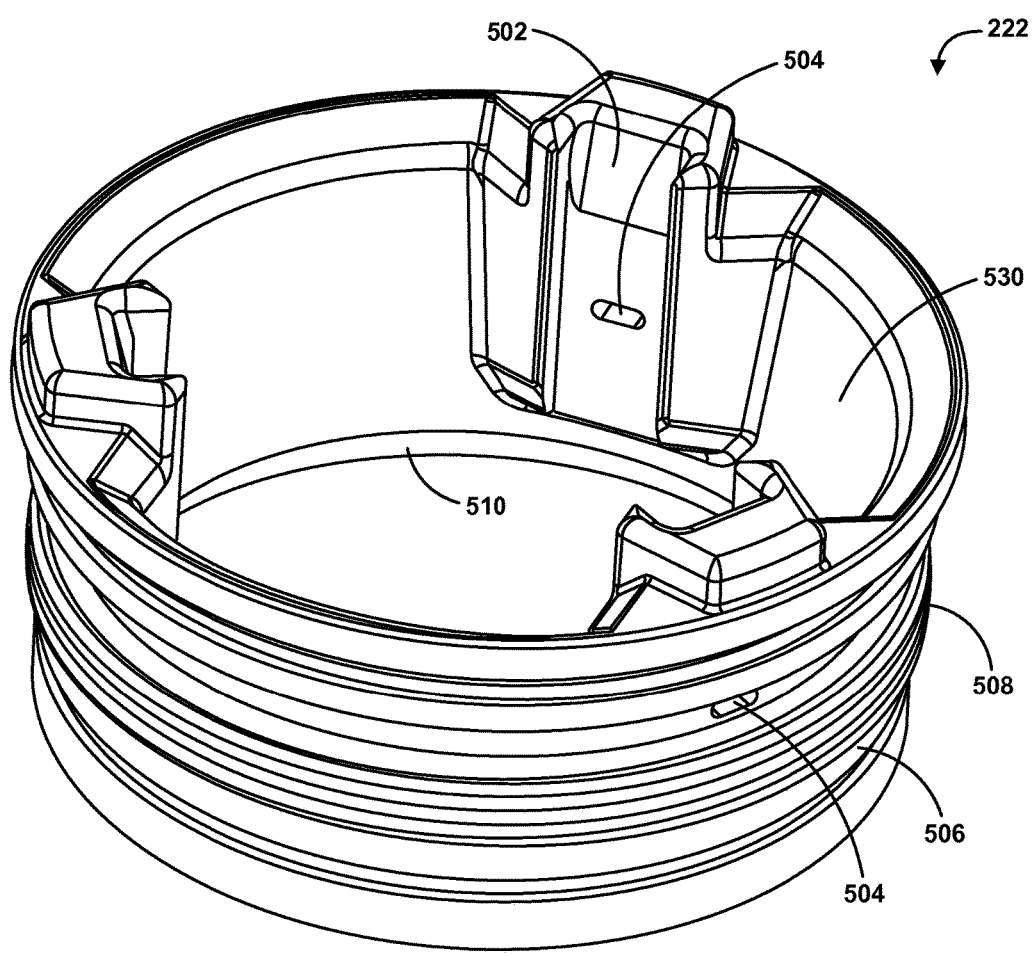
Figure 5G:
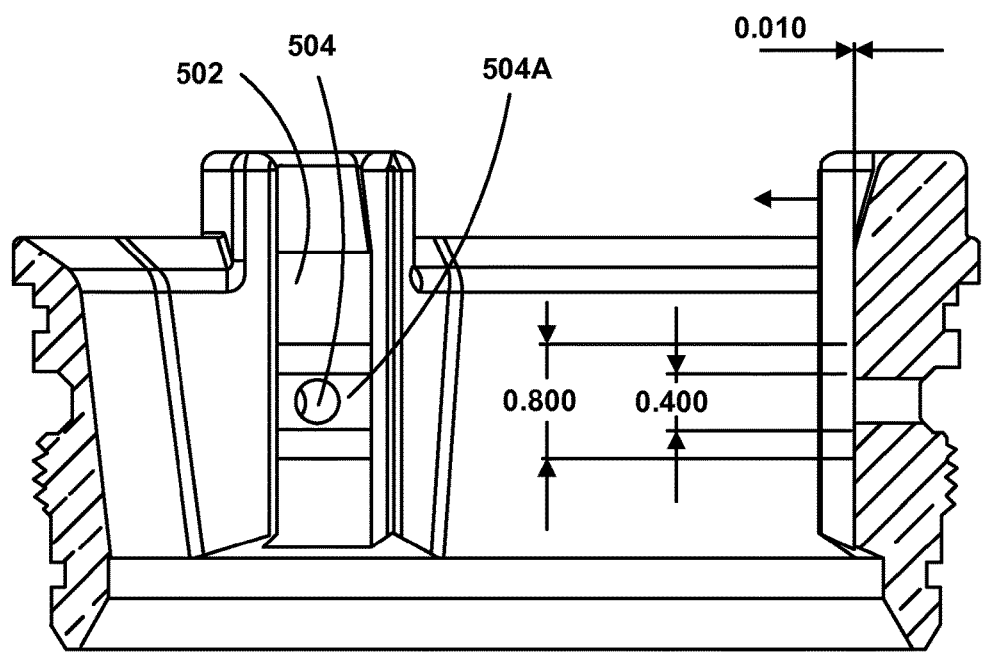

FIGS. 5A-5G show different views of the valve seat ring 222, in accordance with one embodiment of the invention. FIG. 5A is a perspective view of the valve seat ring 222, in accordance with one embodiment of the invention. FIG. 5B is a top view of the valve seat ring 222, in accordance with one embodiment of the invention. FIG. 5C is a side view of the valve seat ring 222, in accordance with one embodiment of the invention. FIGS. 5D and 5G are sectional views 5D-5D (see FIG. 5C) view of the valve seat ring 222, in accordance with one embodiment of the invention. FIG. 5E is a detail view of the slots 502 in the valve seat ring 222, in accordance with one embodiment of the invention. FIG. 5F is a detail view of the drain holes 504 in the valve seat ring 222, in accordance with one embodiment of the invention.

The slot 502 has a depth tolerance of about 0.003" from a center 552 of the valve seat ring 222. A bottom portion 506 of the valve seat ring 222 seats into the inlet elbow 300. By way of example, the valve seat ring 222 can seat into the inner diameter 308A of the drain ring recess 308 in the outlet flange 306 of the inlet elbow 300 (see FIG. 3A).

The valve seat ring 222 can include a threaded portion 508. The threaded portion 508 can thread into the drain ring 198 (see FIG. 1). At least one of the slots 502 includes at least one drain hole 504. The drain hole 504 can have any suitable shape e.g., round, rectangular, oval or elliptical. The valve seat ring 222 includes a valve seat 510 on the inner surface of the bottom portion 506. The valve seat 510 has an angle λ of between about 30 and about 89 degrees (see FIG. 5D). As will be explained in more detail below, the angle λ of the valve seat 510 is selected to receive the seat valve rubber 234 and close the valve control device 200 to stop water flow through the inlet elbow 300 and into the standpipe 195.

Referring to FIG. 5G, the drain hole 504 can be round or other shape. It should be understood that while the drain holes 504 are shown in a substantially round or oval shape the drain port shape can be round, square or other shape. The drain holes 504 are in the slots 502 at the correct height such that the tri-arm valve top plate 230 can cover and uncover the holes at the correct times in the opening and closing of the valve as described in more detail below.

As shown in FIG. 5G, the drain holes 504 are included in a slightly raised plateau 504A. The slightly raised plateau 504A is raised about 0.010 inch+/−about 0.001 inch from the slot 502. The raised plateau 504A can aid in sealing the drain holes 504 when the drain holes are covered by the tri-arm valve top plate 230. The raised plateau 504A provides a surface area to form a seal with the replaceable inserts 228 installed on the outer surfaces 408 of the stabilizer arms 406 of the tri-arm valve top plate 230. The surface area of the raised plateau 504A is less than the surface area of the slot 502. The surface area of the raised plateau 504A can be less than about one third of the surface area of the slot 502. By way of example, the surface area of the raised plateau 504A can be less than about one fifth of the surface area of the slot 502.

The smaller surface area of the raised plateau 504A improves the sealing function of the tri-arm valve top plate 230. The smaller surface area of the raised plateau 504A also reduces the friction between the tri-arm valve top plate 230 and the slot 502, thus providing a smoother, longer lasting, more reliable operation of the valve control device 200.

Figure 6A:
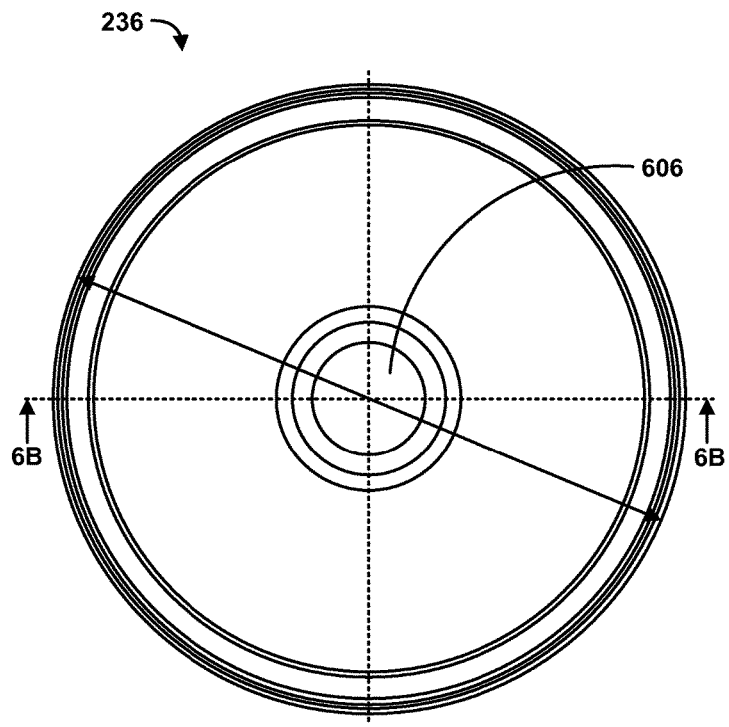
FIGS. 6A-6C show different views of the valve bottom plate, in accordance with one embodiment of the invention.
Figures 6B, 6C:
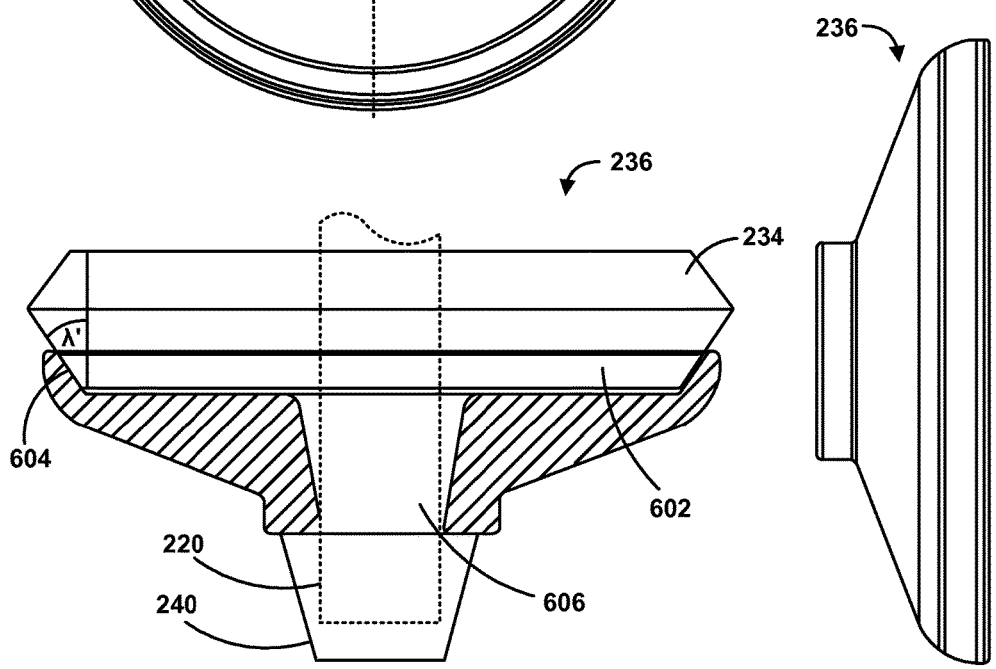

FIGS. 6A-6C show different views of the valve bottom plate 236, in accordance with one embodiment of the invention. FIG. 6A is a top view of the valve bottom plate 236, in accordance with one embodiment of the invention. FIG. 6B is a sectional view 6B-6B (see FIG. 6A) of the valve bottom plate 236, in accordance with one embodiment of the invention. FIG. 6C is a side view of the valve bottom plate 236, in accordance with one embodiment of the invention. As shown in FIG. 6B, the valve bottom plate 236 has recess 602. The recess 602 has a valve seat 604. The valve seat 604 has an angle λ' of between about 30 and about 89 degrees. The recess 602 receives the seat valve rubber 234. The seat valve rubber 234 is secured between the valve bottom plate 236 and the bottom surface 404 of the tri-arm valve top plate 230.

The valve bottom plate 236 also includes a valve bottom plate central channel 606. The lower operating stem 220 (see FIG. 2) passes through the valve top central channel 412 of the tri-arm valve top plate 230 and the valve seat rubber 234 and through the valve bottom plate central channel 606. The valve bottom plate 236, the valve seat rubber 234 and the tri-arm valve top plate 230 are secured to the lower operating stem 220 between the stem pin groove 414 (see FIG. 4A) and the bottom plate nut 240.

Standpipe Drain System

FIGS. 7A-7C show different views of the saturation ring 199, in accordance with one embodiment of the invention. FIG. 7A is a top view of the saturation ring 199, in accordance with one embodiment of the invention. FIG. 7B is a side view of the saturation ring 199, in accordance with one embodiment of the invention. FIG. 7C is a sectional view 7C-7C (see FIG. 7A) of the saturation ring 199, in accordance with one embodiment of the invention. The saturation ring 199 includes two or more bolt holes 702. The bolt holes are aligned with the bolts 196 that couple the standpipe 195 to the inlet elbow 300 (see FIG. 1). The saturation ring 199 includes a substantially flat top seat 708. The top seat 708 includes a seal groove 708A. The underside of the saturation ring 199 includes a drain channel 710 and multiple notches 704 and outlet notches 706.

FIGS. 8A-8C show different views of the drain ring 198, in accordance with one embodiment of the invention. FIG. 8A is a top view of the drain ring 198, in accordance with one embodiment of the invention. FIG. 8B is a sectional view 8B-8B (see FIG. 8A) of the drain ring 198, in accordance with one embodiment of the invention. FIG. 8C is a side view of the drain ring 198, in accordance with one embodiment of the invention. As shown in FIG. 8B, the drain ring 198 includes a threaded portion 802. The threaded portion 802 meshes with the threaded portion 508 of the valve seat ring 222.

The drain ring 198 also includes multiple drain nipples 804. Each of the drain nipples 804 includes a drain port 806. The drain nipples 804 substantially aligned with the notches 704 in the saturation ring 199. Each of the drain ports 806 can be aligned with one of the drain holes 504 in the valve seat ring 222 (see FIG. 5A).

Figures 9A, 9B:
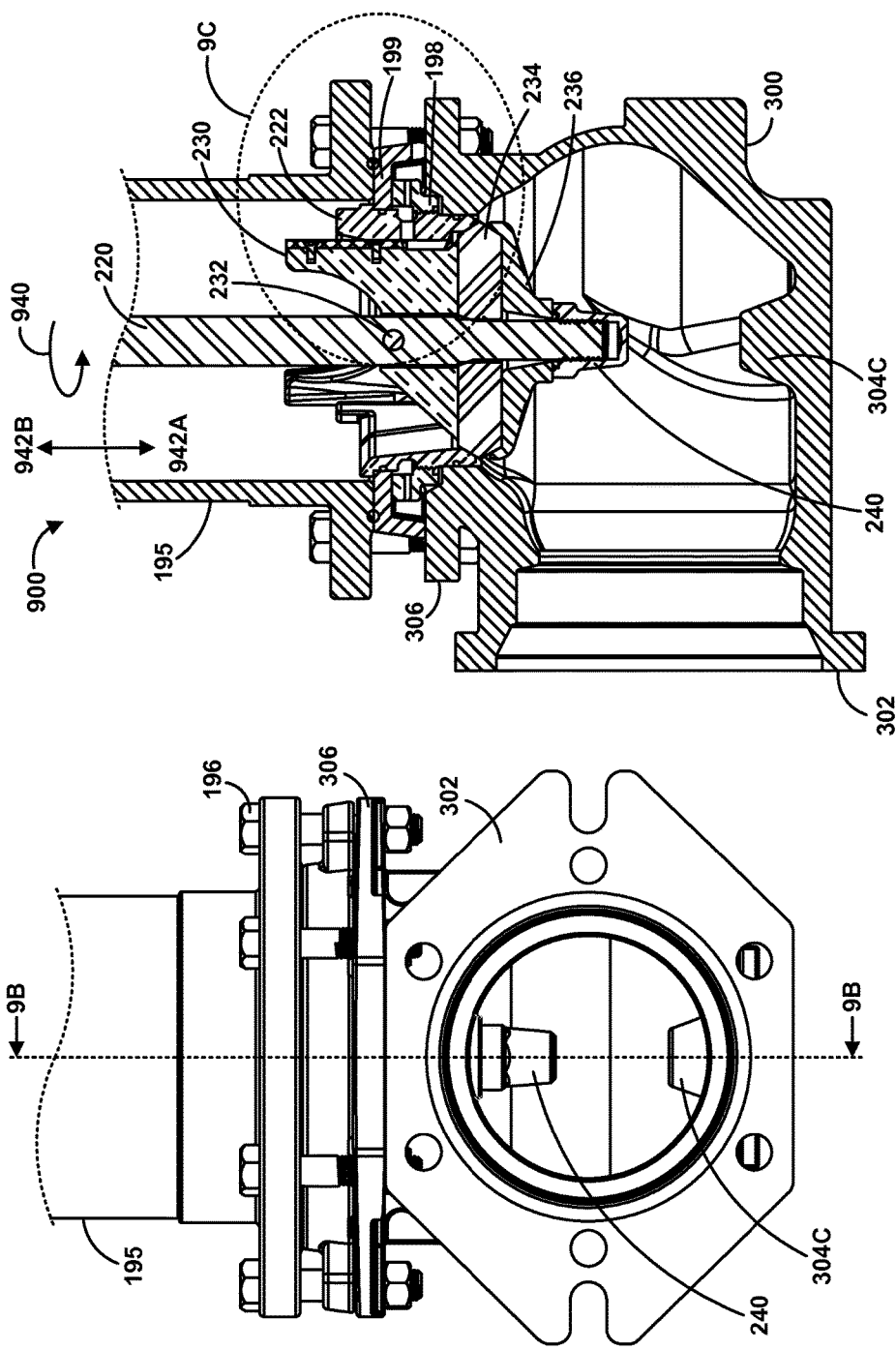
FIGS. 9A-9F show different views of the inlet elbow and the valve control device 200, in accordance with one embodiment of the invention.
Figure 9C:
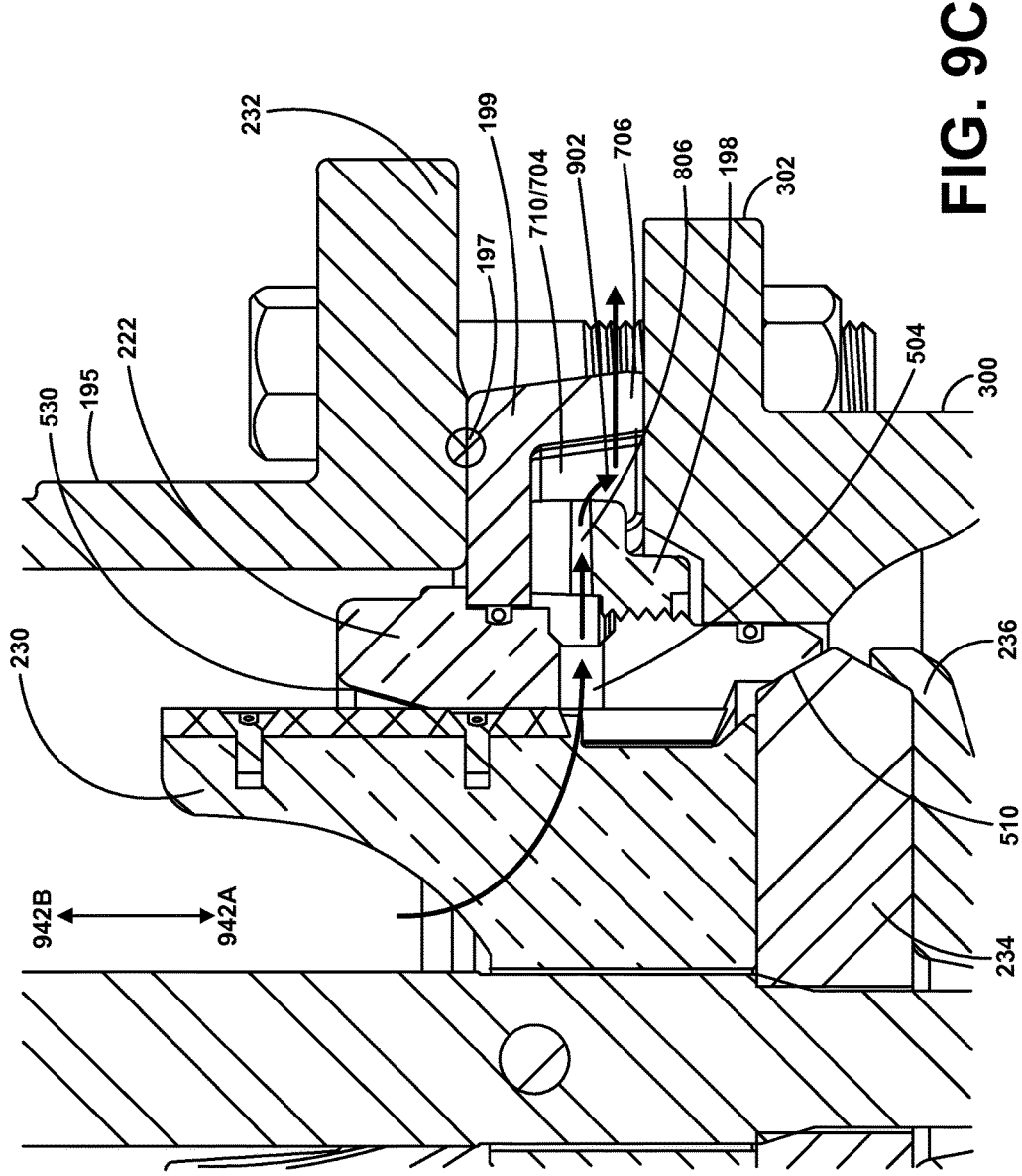
Figure 9D:
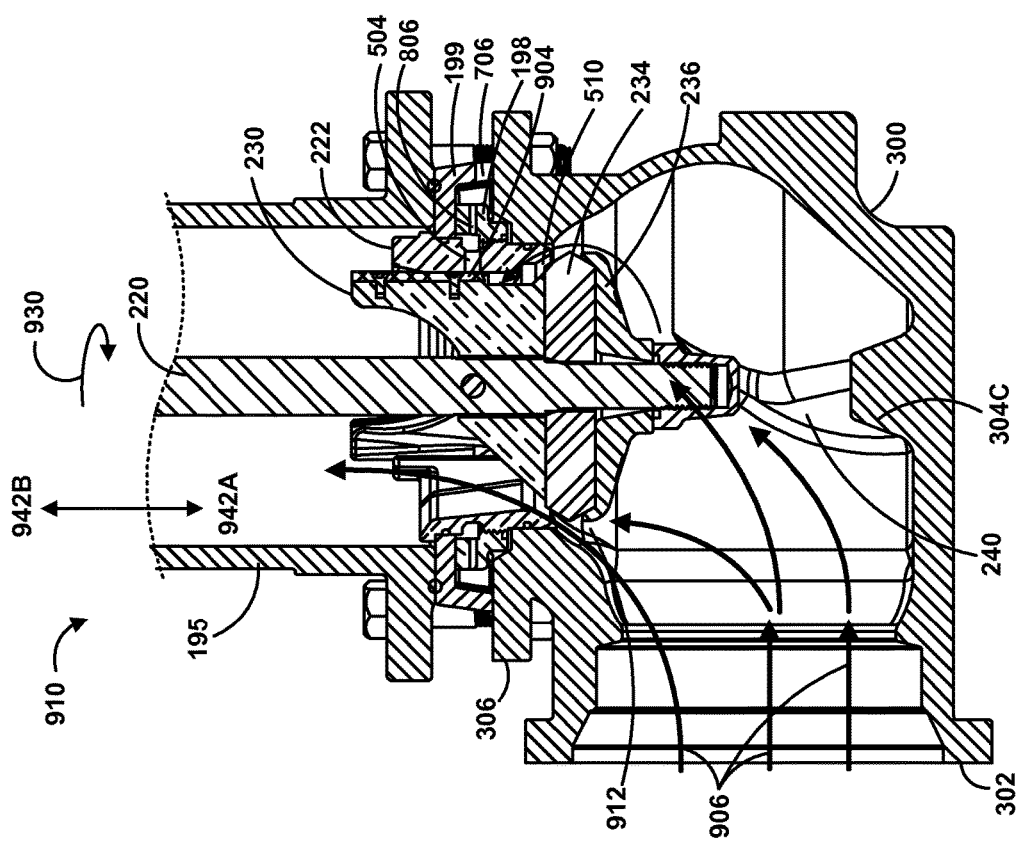
Figure 9E:
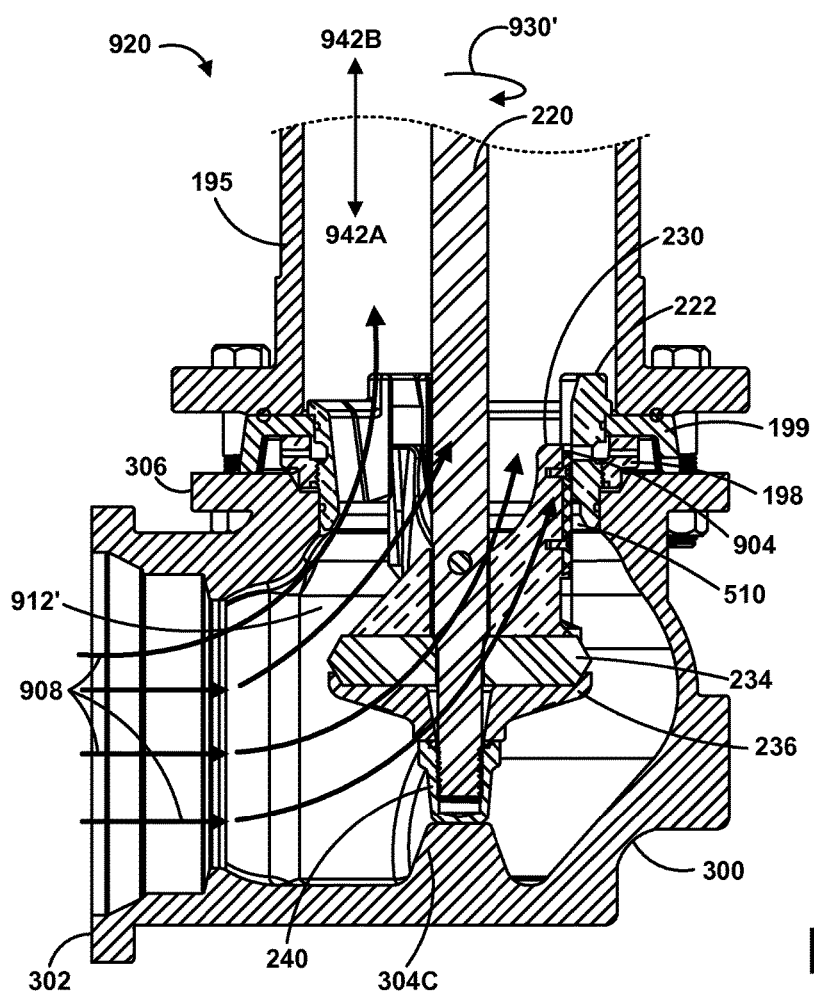
Figure 9F:
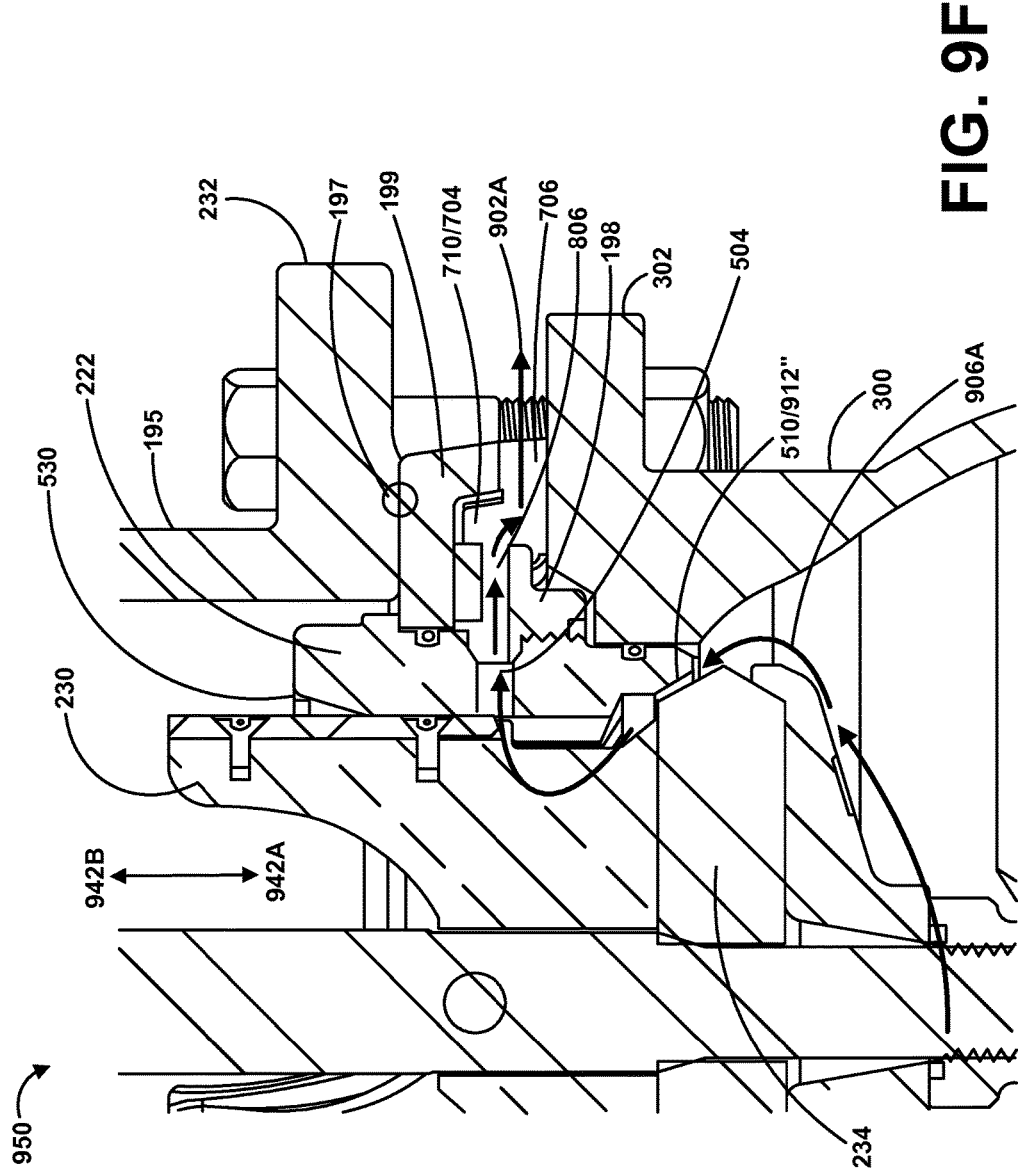

FIGS. 9A-9F show different views of the inlet elbow 300 and the valve control device 200, in accordance with one embodiment of the invention. FIG. 9A is an inlet view of the inlet elbow 300 and the valve control device 200, in accordance with one embodiment of the invention. FIG. 9B is a sectional view 9B-9B (see FIG. 9A) of the inlet elbow 300 and the valve control device 200 in a closed position, in accordance with one embodiment of the invention. FIG. 9C is a detailed view of the inlet elbow 300 and the valve control device 200 in the closed position, in accordance with one embodiment of the invention. FIG. 9D is a sectional view 9B-9B (see FIG. 9A) of the inlet elbow 300 and the valve control device 200 in a partially opened position, in accordance with one embodiment of the invention. FIG. 9E is a sectional view 9B-9B of the inlet elbow 300 and the valve control device 200 in a fully open position, in accordance with one embodiment of the invention. FIG. 9F is a sectional view 9B-9B (see FIG. 9A) of the inlet elbow 300 and the valve control device 200 in a slightly open position 950, in accordance with one embodiment of the invention.

A circuitous drain route 902 is formed between the inside of the standpipe 195 (e.g, an outlet portion 530 of the valve seat ring 222) and the outside of the standpipe. The circuitous drain route 902 is defined by the drain holes 504 in the valve seat ring 222, the drain ports 806 in the drain ring 198 and the notches 704, outlet notches 706 and drain channel 710 in the saturation ring 199. The circuitous drain route 902 allows the standpipe 195 to drain when the valve control device 200 is in the closed position 900. The circuitous drain route 902 prevents intrusion and blockage by dirt and plant roots (e.g., trees, bushes and other plant root systems). The circuitous drain route 902 is closed or cut off by the outer surfaces 408 of the stabilizer arms 406 of the tri-arm valve top plate 230. By way of example, when the valve control device 200 is in the partially open position 910 (FIG. 9D) as compared to the fully open position 920 (FIG. 9E). The circuitous drain route 902 appears to be shown as being a direct through path, however, it should be understood that the drain holes 504, the outlet notches 706 and the drain ports 806 are offset radially around the circumference. The water draining through the circuitous drain route 902 turns left or right radially from each of the drain holes 504 to pass through one or more drain ports 806 and again turns left or right radially from each of the drain ports to one or more of the outlet notches 706.

The valve control device 200 also includes a pressure drain position 950 as shown in FIG. 9F. As the valve control device 200 moves to a slightly open position to form a very small gap 912" between the seat valve rubber 234 and the valve seat 510 in the valve seat ring 222. Simultaneously, the tri-arm valve top plate 230 slightly uncovers the drain holes 504 in the valve seat ring 222. As water pressure still exists inside the valve control device 200, the water 906A pressurizes the circuitous drain route 902. By way of example, the water pressure causes the water 902A to rush out the drain holes 504 and the drain ports 806 in the drain ring 198 and the notches 704, outlet notches 706 and drain channel 710 in the saturation ring 199, thus flushing out the drain route 902. Flushing out the drain route 902 substantially removes any debris that might have accumulated in the drain route. The debris might originate from the water flowing through the valve control device 200 or from the valve control device 200, fire hydrant body 100, standpipe 195 and/or the inlet elbow 300. The debris might also or alternatively originate from sources external of the fire hydrant body 100, standpipe 195 and/or the inlet elbow 300 such as sand, gravel, dirt, insects, worms and/or plant/tree roots.

Figure 10:
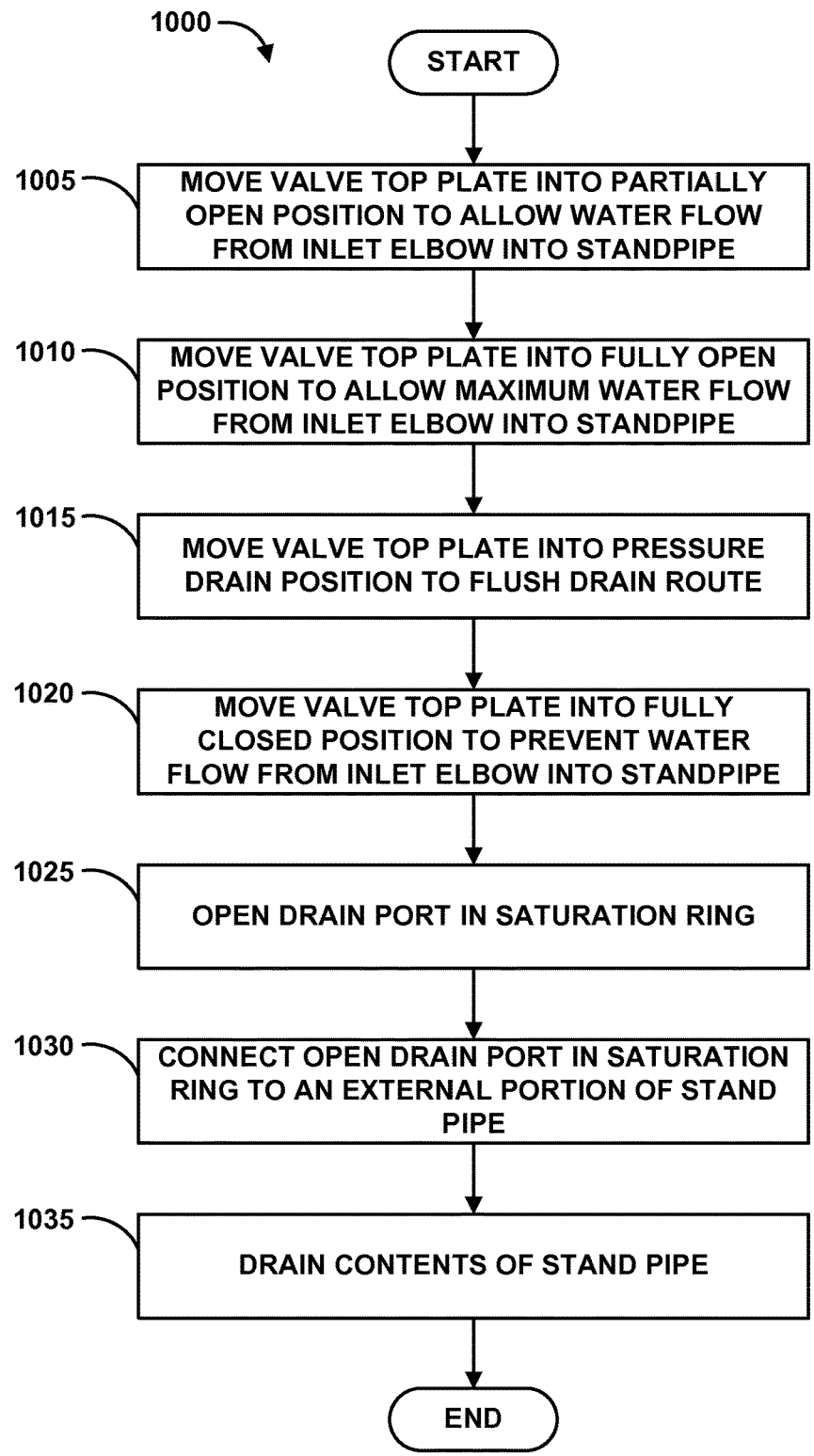
FIG. 10 is a flow chart diagram illustrating the method operations performed in operating the valve control device, in accordance with one embodiment of the invention.

FIG. 10 is a flow chart diagram 1000 illustrating the method operations performed in operating the valve control device 200, in accordance with one embodiment of the invention. In an operation 1005, the operating nut 202 is partially rotated in a first direction 930 as shown in FIG. 9D. Partially rotating the operating nut 202 applies a downward pressure on the upper operating stem 210, lower operating stem 220 and the valve top plate 230 causing the valve top plate to move downward. Moving the valve top plate 230 downward moves the valve top plate into the partially open position 910. In the partially open position 910, a relatively small gap 912 is formed between the seat valve rubber 234 and the valve seat 510 in the valve seat ring 222. The relatively small gap 912 allows a partial water flow 906 through the inlet elbow 300 and past the seat valve rubber 234 into the standpipe 195. The three (or more) stabilizer arms 406 and the conical base 402 of the valve top plate 230 improves flow and stability under partial water flow conditions that can jam a typical valve control device.

In an operation 1010, the operating nut 202 is fully rotated in the first direction 930' to a stopping position as shown in FIG. 9E. Fully rotating the operating nut 202 in the first direction 930' fully depresses the upper operating stem 210, lower operating stem 220 and the valve top plate 230 in direction 942A. Fully depressing the valve top plate 230 moves the valve top plate into the fully open position 920. In the fully open position 920, a maximum open gap 912' is formed between the seat valve rubber 234 and the valve seat 510 in the valve seat ring 222. The maximum open gap 912' allows a maximum water flow 908 through the inlet elbow 300 and past the seat valve rubber 234 into the standpipe 195.

The contoured floor 320 of the elbow body 304 reduces the turbulence and otherwise smoothes the water flow 908 through the maximum open gap 912'. The substantially triangular cross section shape of the three (or more) stabilizer arms 406 and the conical base 402 of the valve top plate 230 also reduces the turbulence in and otherwise smoothes the water flow 908. The reduced turbulence and smoothed water flow 908 allows a greater quantity of water to pass through the maximum open gap 912' with a reduced pressure drop through the valve control device 200.

In an operation 1015, the operating nut 202 is partially rotated in a second direction 940 opposite the first direction 930 approaching a fully closed position but remaining partially open as shown in FIG. 9F. Rotating the operating nut 202 in the second direction 940 draws the upper operating stem 210, lower operating stem 220 and the valve top plate 230 partially upward in direction 942B. Drawing the valve top plate 230 partially upward moves the valve top plate into the pressure drain position 950. In the pressure drain position 950, a relatively small gap 912" remains between the seat valve rubber 234 and the valve seat 510 in the valve seat ring 222. The valve top plate 230 opens at least one drain hole 504 in the valve seat ring 222, thus opening the circuitous drain route 902. As the water in the standpipe 195 and the valve control device 200 is still pressurized, then the water will flow under that pressure through the circuitous drain route 902 and flush the circuitous drain route.

In an operation 1020, the operating nut 202 is fully rotated in a second direction 940 opposite the first direction 930 to a stopping position as shown in FIG. 9B. Fully rotating the operating nut 202 in the second direction 940 draws the upper operating stem 210, lower operating stem 220 and the valve top plate 230 fully upward in direction 942B. Drawing the valve top plate 230 fully upward moves the valve top plate into the fully closed position 920. In the fully closed position 920, the seat valve rubber 234 seals against the valve seat 510 in the valve seat ring 222, thus cutting off all water flow 906, 908 through the inlet elbow 300 and past the seat valve rubber 234 into the standpipe 195. As the valve top plate 230 moves from the fully open position 930, through the partially open position 910 toward the fully closed position 920, the three (or more) stabilizer arms 406 and the conical base 402 of the valve top plate 230 improves flow and stability under partial water flow conditions that can jam a typical valve control device.

In an operation 1025, closing the valve control device 200 uncovers at least one drain hole 504 in a slot of a saturation ring 222. The drain hole 504 is in an outlet portion of the valve seat ring 222. In an operation 1030, the circuitous drain route 902 is opened when the valve top plate is in the fully closed position 920.

In an operation 1035, the water contained in the standpipe 195 drains through the circuitous drain route 902 to an external portion standpipe 195. The circuitous drain route 902 includes the at least one drain hole 504 in the valve seat ring 222, a one or more drain ports 806 in the drain ring 198 and at least one of the notches 704 and at least one of the outlet notches 706 and the drain channel 710 in the saturation ring 199.

Valve Access Channel Drain System

FIGS. 11A-11C show different views of the fire hydrant body 100, in accordance with one embodiment of the invention. FIG. 11A is a front view of the fire hydrant body 100, in accordance with one embodiment of the invention. FIG. 11B is a sectional view 11B-11B (see FIG. 11A) of the fire hydrant body 100, in accordance with one embodiment of the invention. FIG. 11C is a top view of the fire hydrant body 100, in accordance with one embodiment of the invention. The fire hydrant body 100 includes a valve access channel drain port 1102. The valve access channel drain port drains any water from the valve access channel 100C-3. Draining the water from the valve access channel 100C-3 helps prevent corrosion and freezing that may interfere with proper operation of the locking cap 106 and/or the valve control device 200.

Figure 12B:
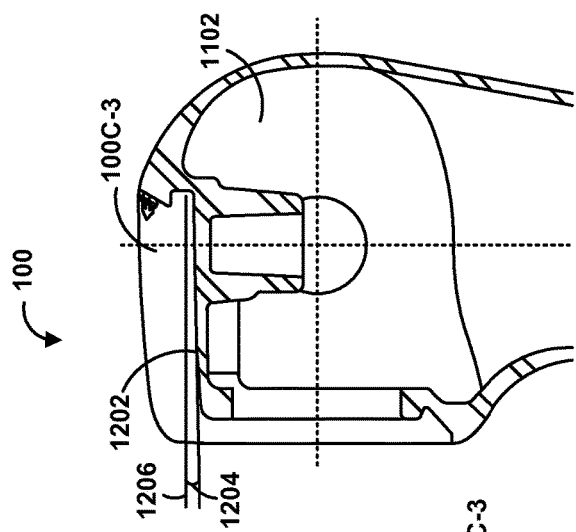
FIGS. 12A-12C show different views of the fire hydrant body, in accordance with one embodiment of the invention.
Figure 12C:
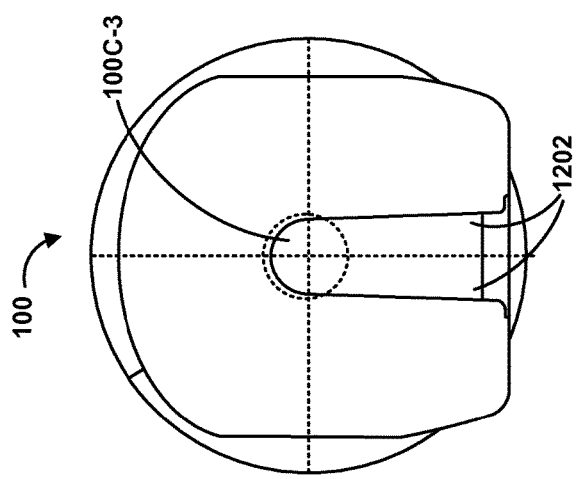
Figure 12A:
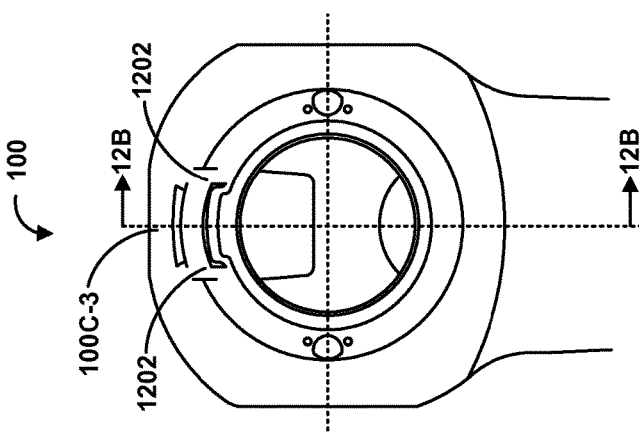

FIGS. 12A-12C show different views of the fire hydrant body 100, in accordance with one embodiment of the invention. FIG. 12A is a front view of the fire hydrant body 100, in accordance with one embodiment of the invention. FIG. 12B is a sectional view 12B-12B (see FIG. 12A) of the fire hydrant body 100, in accordance with one embodiment of the invention. FIG. 12C is a top view of the fire hydrant body 100, in accordance with one embodiment of the invention. The fire hydrant body 100 includes one or more valve access channel drain 1202. The valve access channel drain channel 1202 drains any water from the valve access channel 100C-3.

The valve access channel drain channel 1202 slopes slightly downward toward the cap body 106C of locking cap 106. The slope 1204 can be very slight such as about 2 degrees down from a horizontal 1206. If needed the degree of slope 1204 can be increased to achieve the desired drainage. The valve access channel drain channel 1202 can be straight or have a slight downward curvature.

Sprinkler Cap

FIGS. 13A-13F illustrate a sprinkler cap 106' in accordance with embodiments of the present invention. The sprinkler cap 106' can be used as an alternative to the locking cap 106 in the fire hydrant 100 as described above. The sprinkler cap 106' provides the additional features of sprinkler ports 1302 and a sprinkler cap control lock 1310. It should be understood that the sprinkler ports 1302 could be alternatively and/or additionally The sprinkler cap 106' includes a tongue 106A' that includes a hole 1312 (see FIG. 13E) where the sprinkler cap control lock 1310 is secured. The sprinkler control lock 1310 includes a locking mechanism 1330. A key 1332 is used to unlock the locking mechanism 1330. The locking mechanism 1330 is secured to the sprinkler control lock 1310 by a nut 1334. A double-sided cam 1320 is secured to the locking mechanism 1330 by nut 1336. The locking mechanism 1330 rotates the double-sided cam 1320 between a locked orientation and an unlocked orientation. It should be understood that any suitable locking mechanism can be used instead of locking mechanism 1330 shown herein.

Figure 13A:
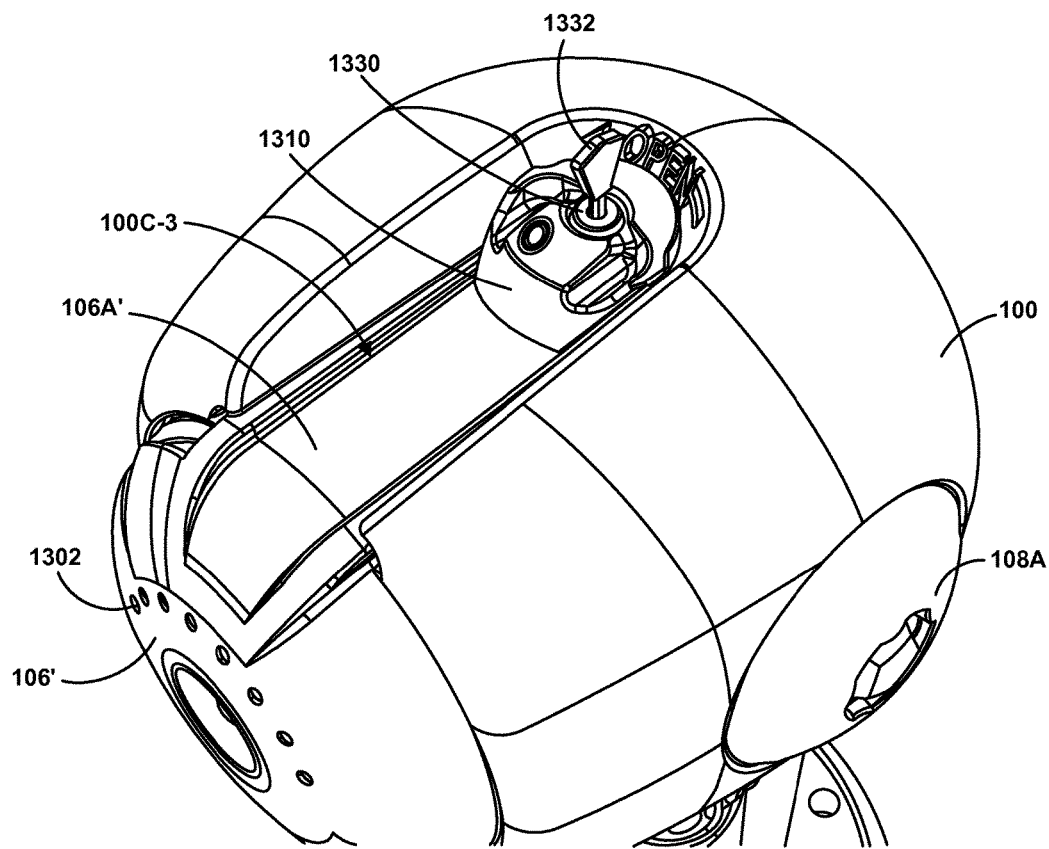
FIGS. 13A-13F illustrate a sprinkler cap in accordance with embodiments of the present invention.
Figure 13B:
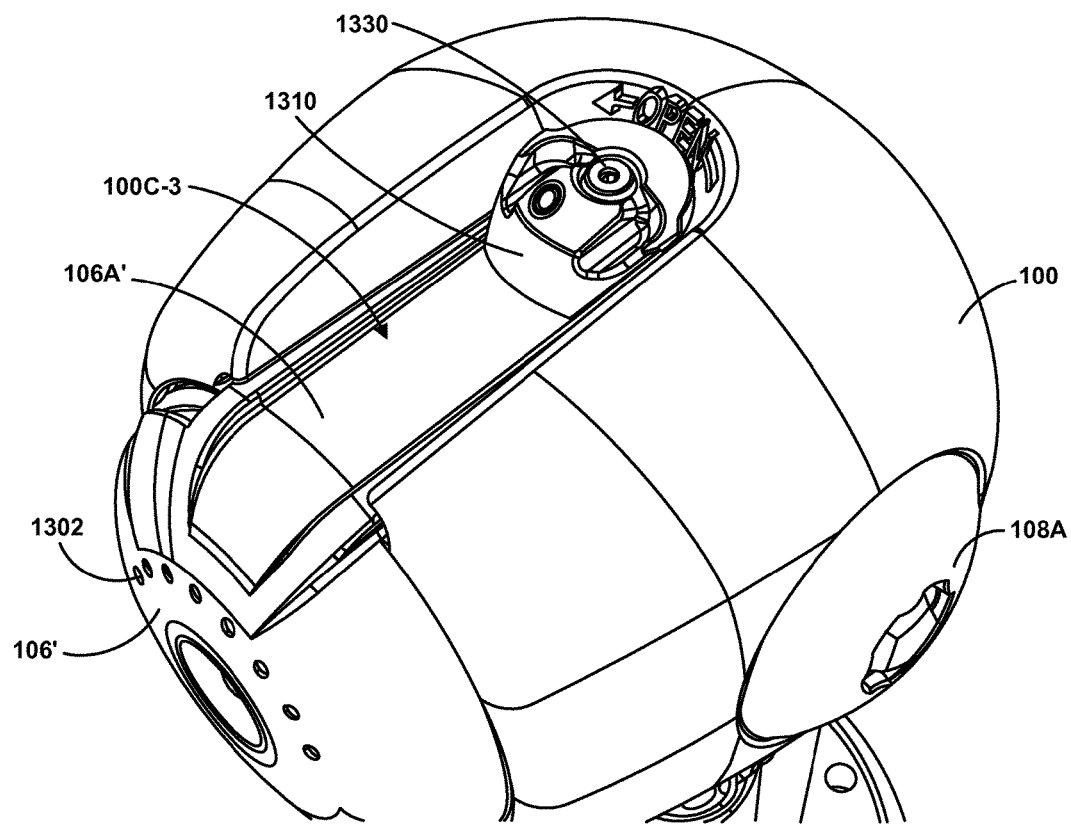
Figure 13C:
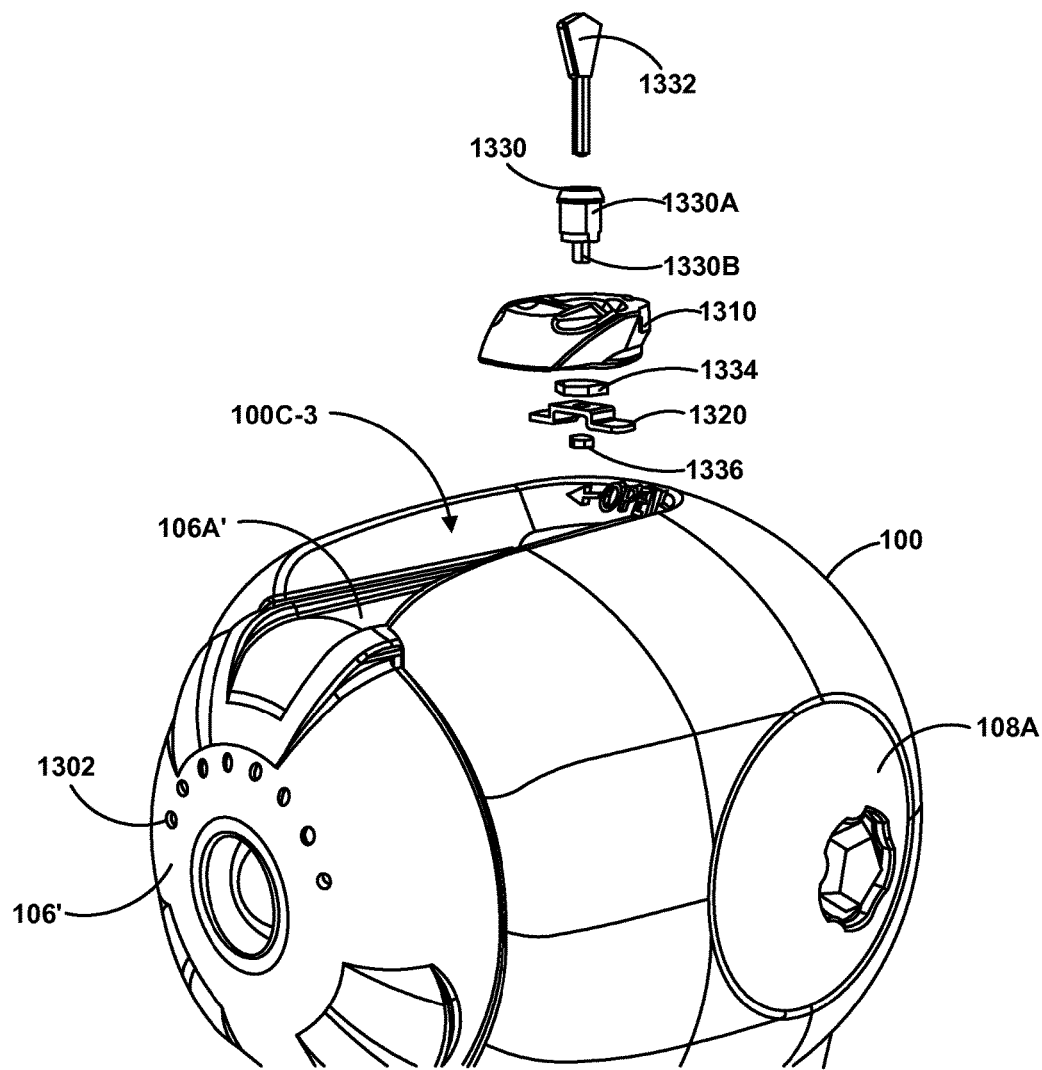
Figure 13D:
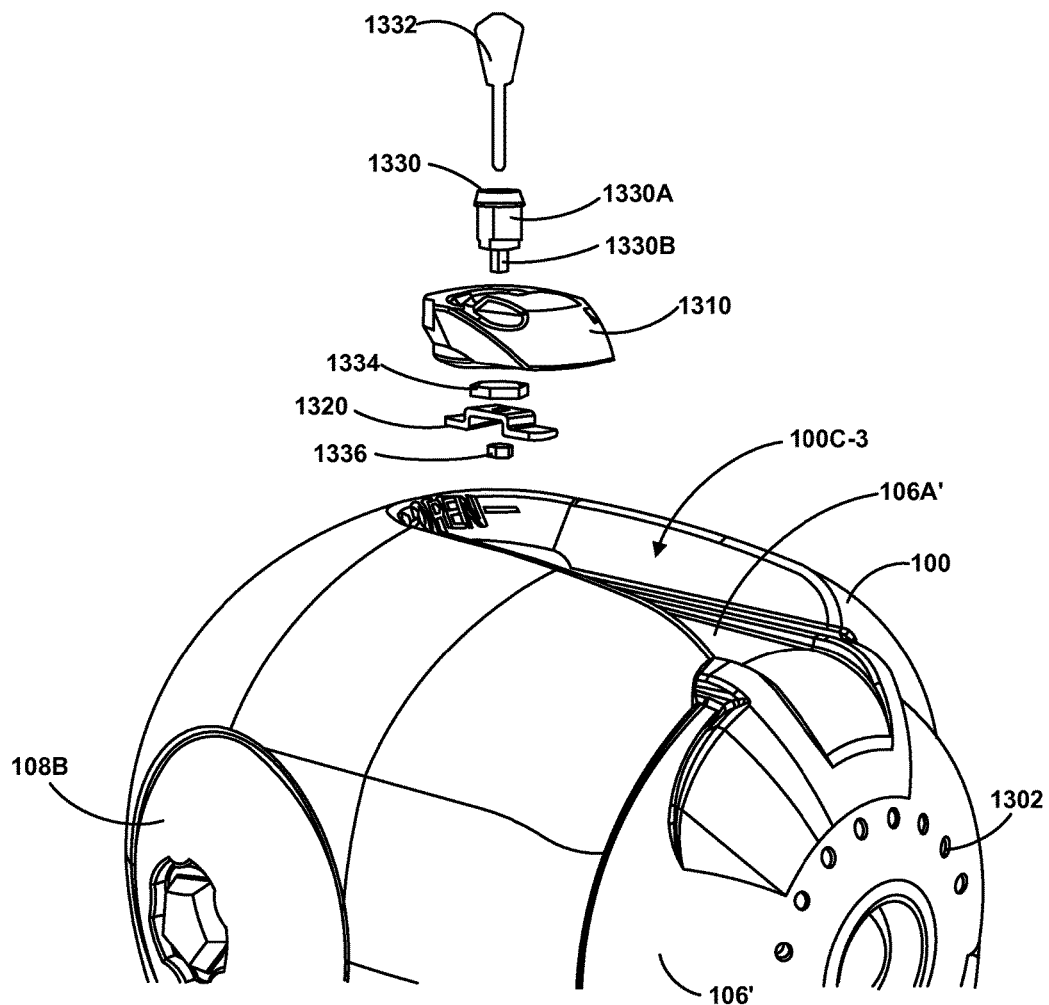
Figure 13E:
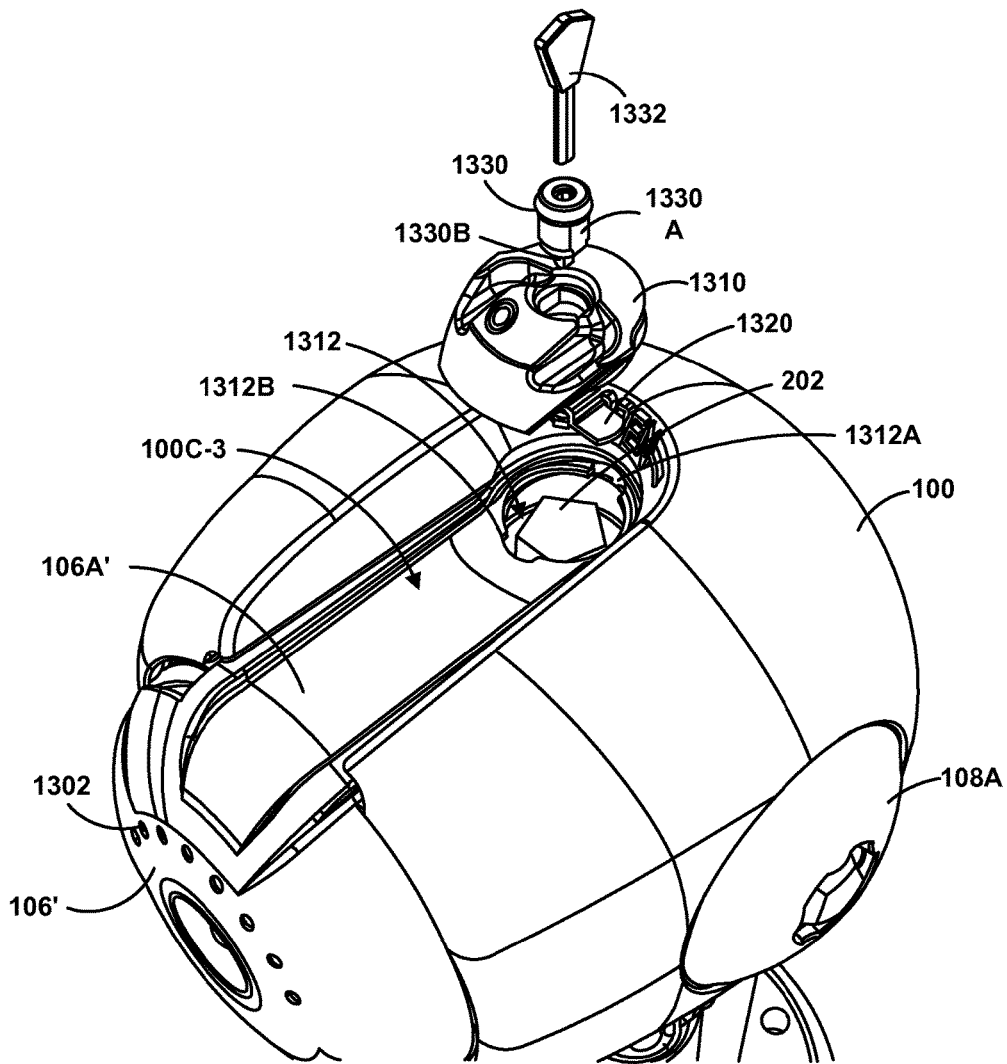
Figure 13F:
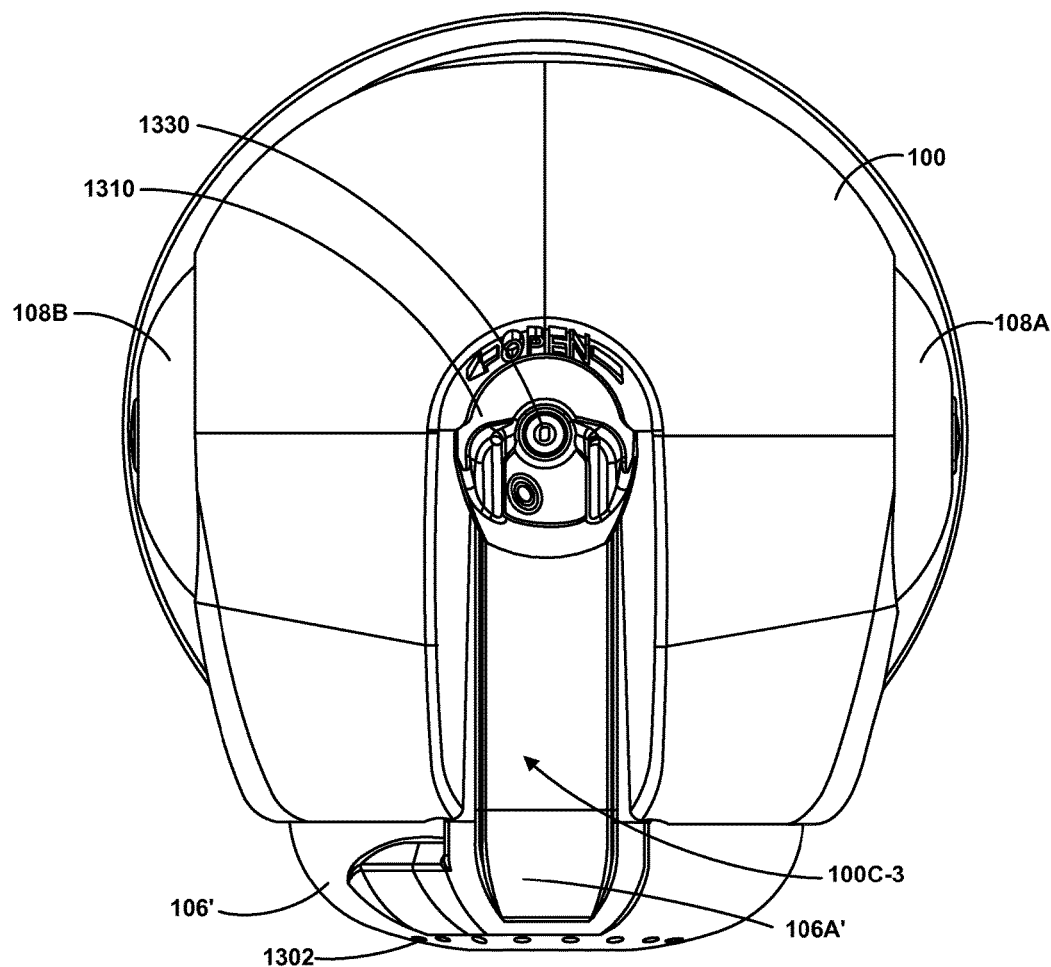

Referring now to FIG. 13E, the double-sided cam 1320 is rotated to align with slots 1312A and 1312B in the unlocked orientation. In the locked orientation, the double-sided cam 1320 is rotated so as to not align with slots 1312A and 1312B. In the unlocked orientation, the sprinkler cap control lock 1310 can be removed from the tongue 106A'.

Removing the sprinkler cap control lock 1310 from the tongue 106A' uncovers the operating nut 202. Once the operating nut 202 is uncovered, an operating tool can be used to turn the operating nut and thereby deliver water through the sprinkler ports 1302 of sprinkler cap 106'.

In this way an authorized person can use the key 1332 to remove the sprinkler cap control lock 1310 and activate the operating nut 202. If desired, after operating nut 202 has been activated, the sprinkler cap control lock 1310 can be secured to tongue 106A' so that the operating nut cannot be tampered with while the sprinkler cap 106' is in operation. At some later time, the authorized person can again remove the sprinkler cap control lock 1310, deactivate the operating nut 202, and then secure the sprinkler cap control lock to tongue 106A' once again so that the operating nut is protected from tampering.

FIGS. 14A, 14B, and 16A-16E show additional details of the sprinkler cap control lock 1310, in accordance with embodiments of the present invention. The sprinkler cap control lock 1310 includes hand holds 1402 for gripping and lifting the sprinkler cap control lock. The channels defining hand holds 1402 also serve to allow water to drain from sprinkler cap control lock 1310.

The sprinkler cap control lock 1310 sides 1301A, 1310B are substantially parallel and close-fitting to the respective sides 100C-3A, 100C-3B of the channel 100C-3. Having the sprinkler cap control lock 1310 sides 1301A, 1310B substantially parallel and close-fitting to the respective sides 100C-3A, 100C-3B of the channel 100C-3 prevents tampering by not providing any substantial surface or edge into which a tool such as a prying tool or a wedging tool can be forced. This substantially prevents an unauthorized person from tampering with the sprinkler cap control lock 1310.

The sprinkler cap control lock 1310 includes a lock mechanism channel 1602 for receiving the locking mechanism 1330. The sprinkler cap control lock 1310 is formed from a durable material similar to the materials used in the fire hydrant 100. Using a similar durable material reduces the opportunity for tampering with the sprinkler cap control lock 1310. Using similar materials also reduces the opportunity for electrolytic corrosion due to dissimilar materials being in close contact. In one embodiment, the sprinkler cap control lock 1310 is a solid construction, e.g., a solid casting. Alternatively, the sprinkler cap control lock 1310 can be machined from a solid blank.

Figure 14A:
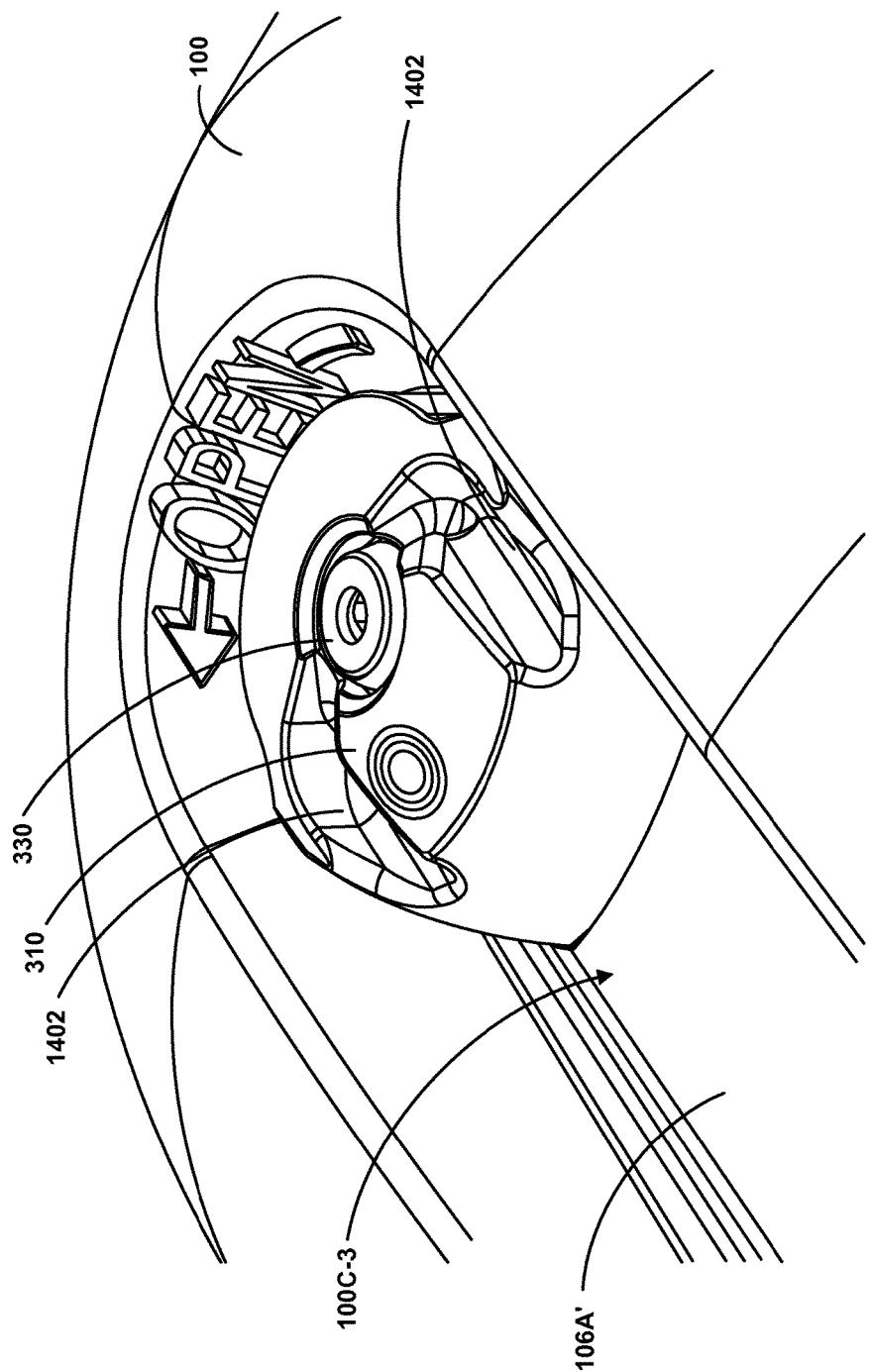
FIGS. 14A and 14B show additional details of the sprinkler cap control lock, in accordance with embodiments of the present invention.
Figure 14B:
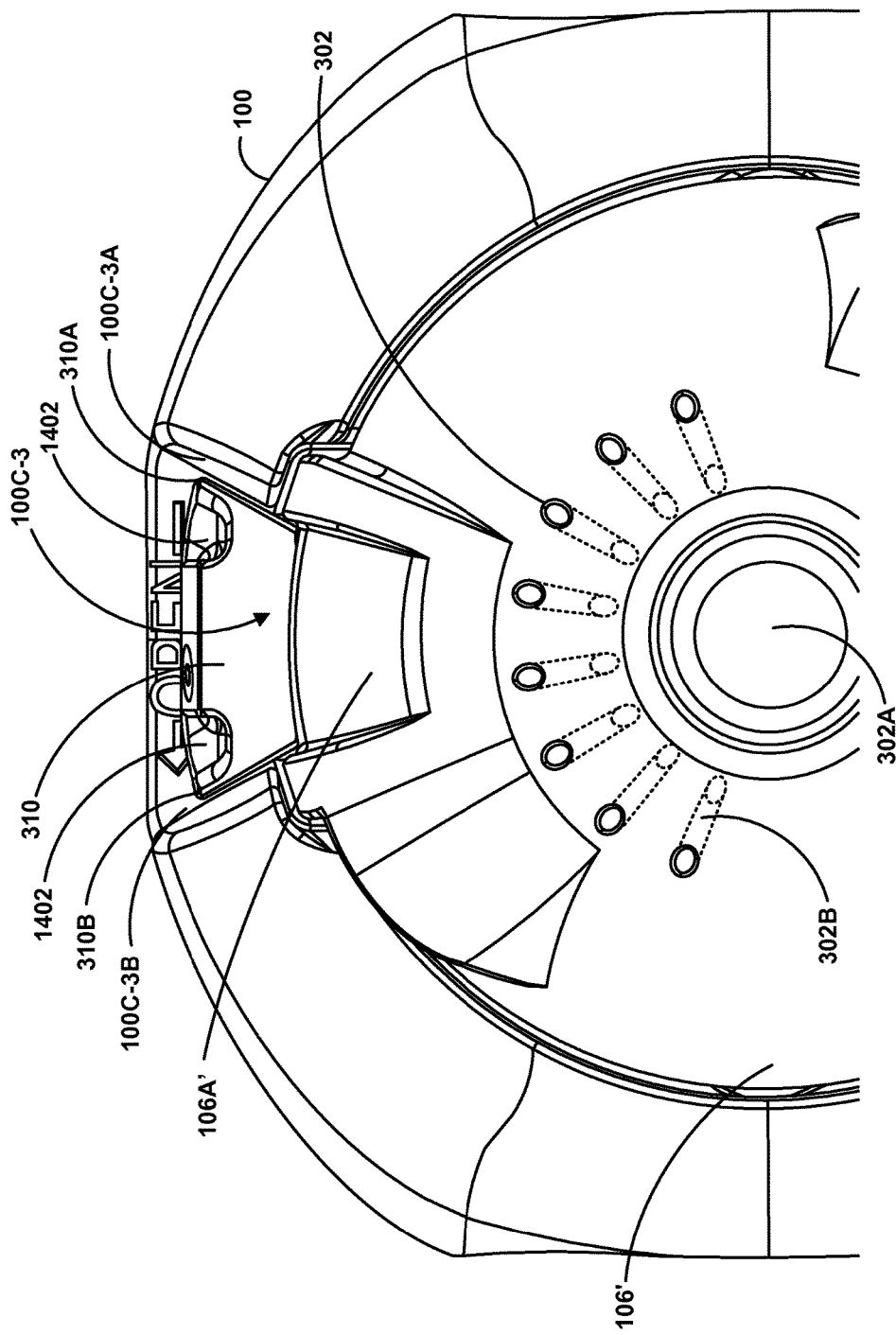

Referring again to FIG. 14B, the sprinkler cap 106' can include multiple sprinkler ports 1302. The number of sprinkler ports 1302 can be varied to meet the needs of particular situations. By way of example, sprinkler cap 106' can have as few as one or two sprinkler ports 1302 or as many as 10 or 20 sprinkler ports. The sprinkler ports 1302 can be arranged in any desired fashion on the face or edges of the sprinkler cap 106'. In one exemplary orientation shown in FIG. 14B, the sprinkler ports 1302 are arranged in a radial fashion which radiates outward from an approximate center 1302A as shown in FIG. 14B. It should be understood that other arrangements including, for example, multiple rows of ports, ports located at different angles, and ports having different spacing also could be used.

Figure 15B:
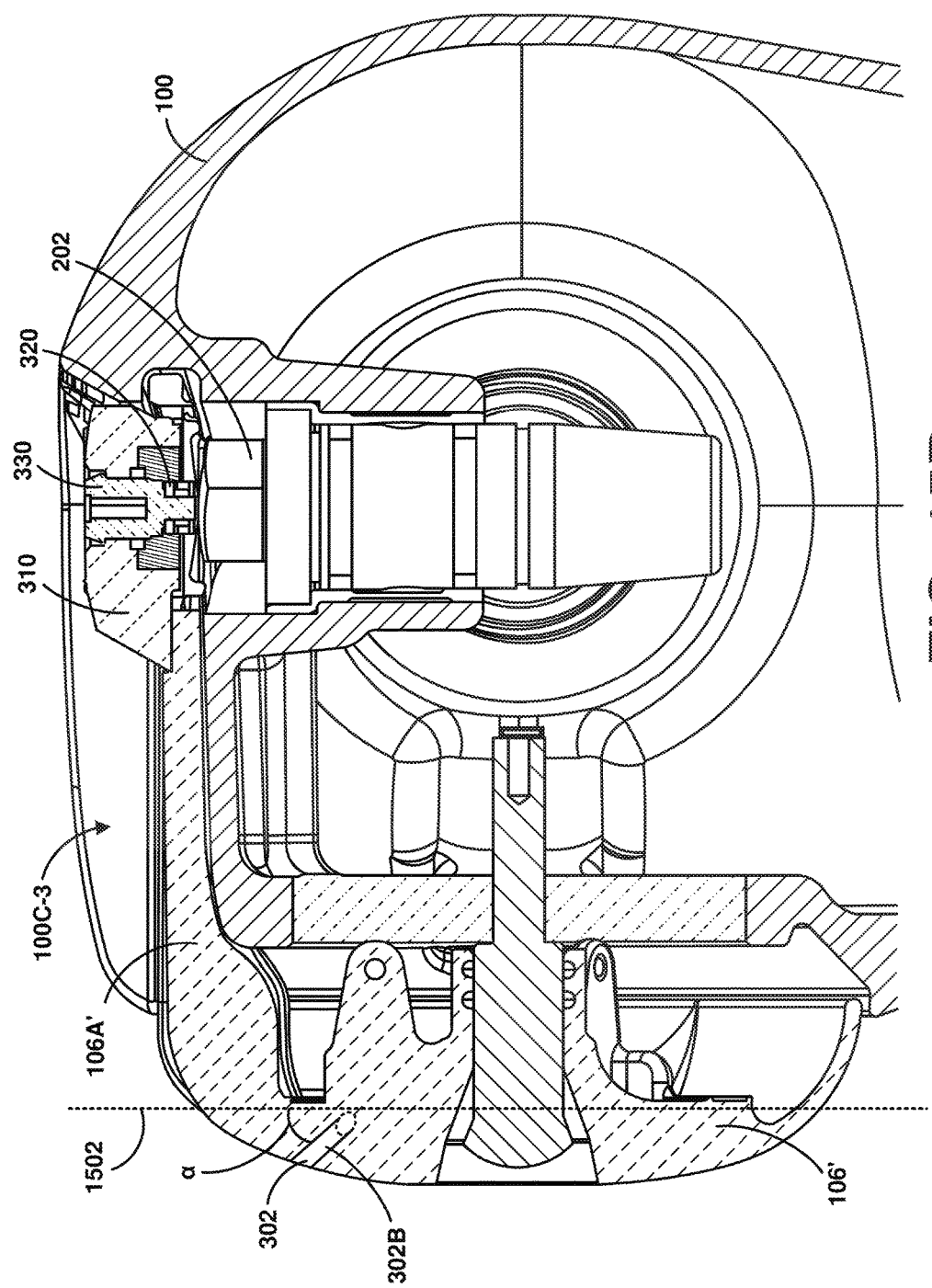
Figure 16C:
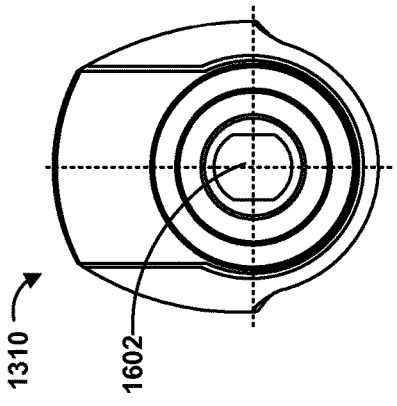
FIGS. 16A-16E show additional details of the sprinkler cap control lock, in accordance with embodiments of the present invention.
Figure 16E:
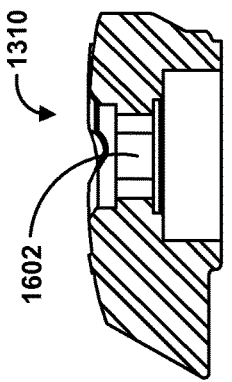
Figure 16B:
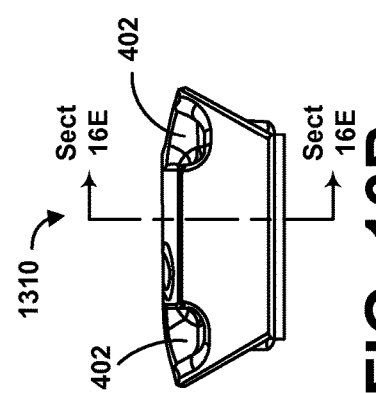
Figure 16D:
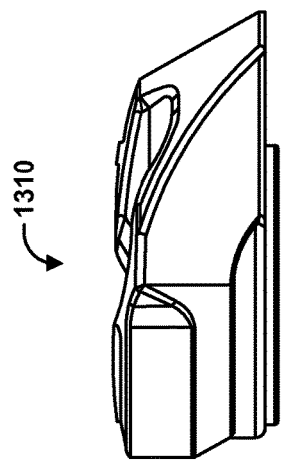
Figure 16A:
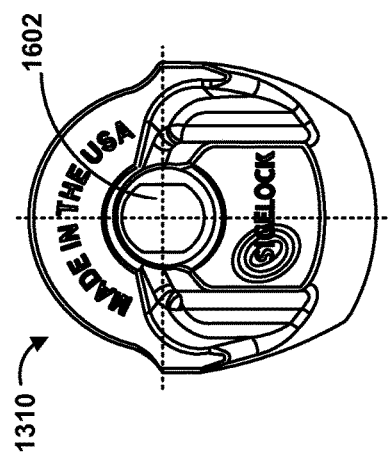
Figure 16F:
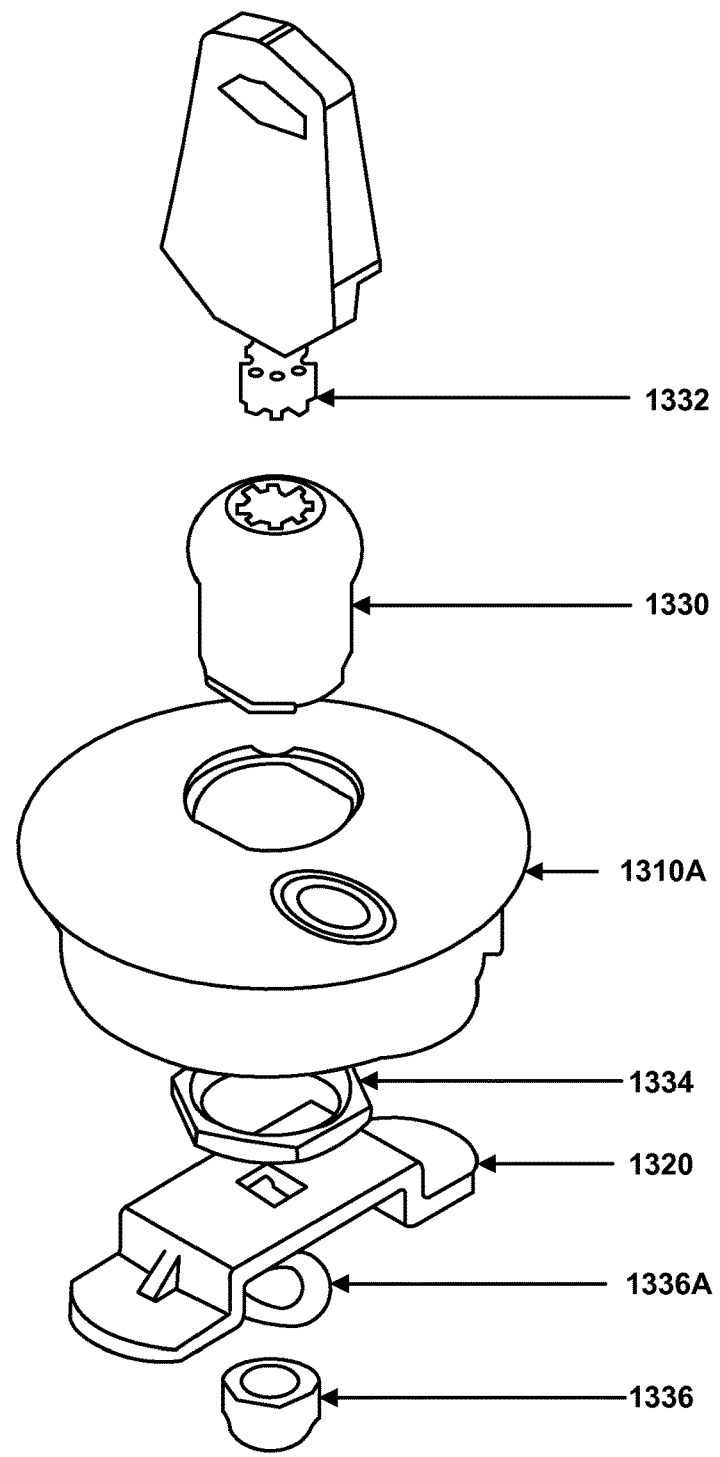
FIGS. 16F-16K show an alternative sprinkler cap control lock, in accordance with embodiments of the present invention.
Figure 16G:
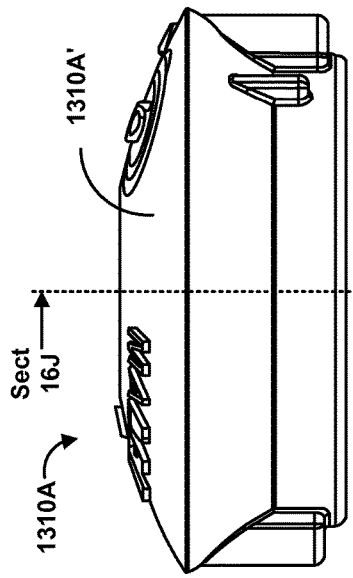
Figure 16I:
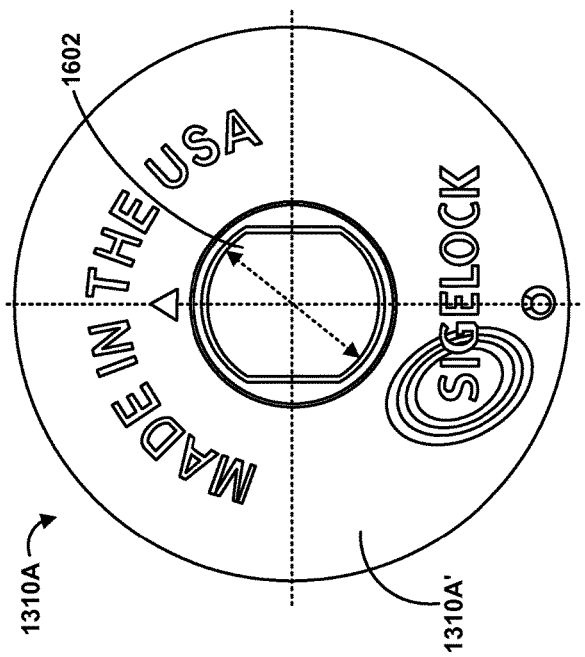
Figure 16H:
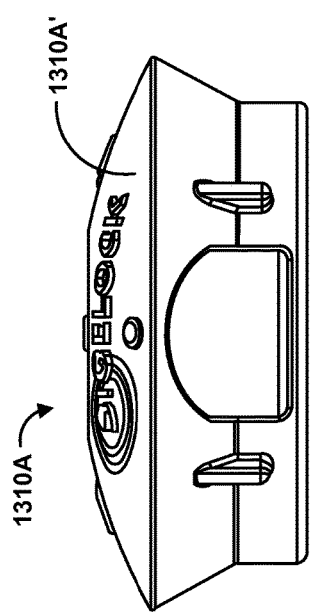
Figure 16J:
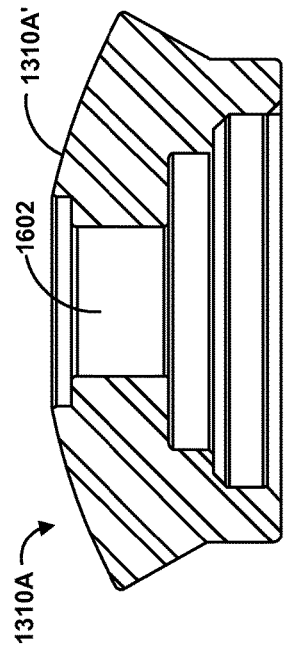
Figure 16K:
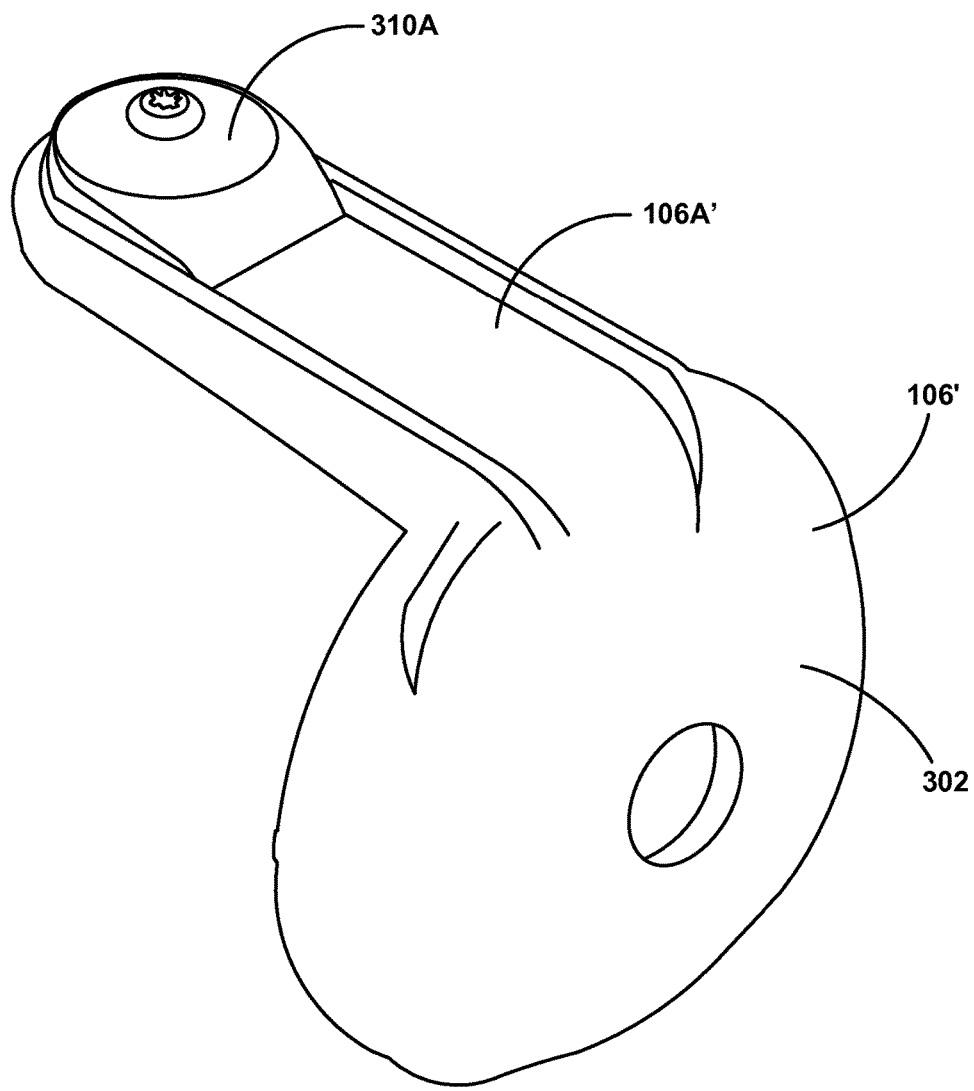

FIGS. 15A and 15B show a sectional view of the sprinkler cap 106', in accordance with embodiments of the present invention. FIG. 15A shows the double-sided cam 1320 in the unlocked orientation. In FIG. 15B, only a small portion of the double-sided cam 1320 is visible because the double-sided cam is in the locked orientation.

FIGS. 16F-16K show an alternative sprinkler cap control lock 1310A, in accordance with embodiments of the present invention. The alternative sprinkler cap control lock 1310A includes a top surface 1310A' that has a substantially rounded profile. The rounded top surface 1310A' is substantially flush with the top surface of the tongue 106A'. Having the sprinkler cap control lock 1310A substantially flush with the top surface of the tongue 106A' prevents tampering by not providing any substantial surface or edge into which a tool such as a prying tool or a wedging tool can be forced. This substantially prevents an unauthorized person from tampering with the sprinkler cap control lock 1310A.

The sprinkler cap control lock 1310A includes a lock mechanism channel 1602 for receiving the locking mechanism 1330. The sprinkler cap control lock 1310A is formed from a durable material similar to the materials used in the fire hydrant 100. Using a similar durable material reduces the opportunity for tampering with the sprinkler cap control lock 1310A. Using similar materials also reduces the opportunity for electrolytic corrosion due to dissimilar materials being in close contact. In one embodiment, the sprinkler cap control lock 1310A is a solid construction, e.g., a solid casting. Alternatively, the sprinkler cap control lock 1310A can be machined from a solid blank.

FIGS. 17A-17D are detailed views of the double-sided cam 1320, in accordance with embodiments of the present invention. The double-sided cam 1320 includes a central portion 1320C and two end portions 1320A, 1320B. As shown, in one embodiment, the double-sided cam 1320 can have an offset between the central portion 1320C and the two end portions 1320A, 1320B. It should be understood, however, that in some situations the offset may not be needed. The central portion 1320C includes a keyway 1324 that is secured to the locking mechanism 1330 so that the locking mechanism can rotate the double-sided cam 1320.

An approximate vertical reference line 502 is provided to illustrate the approximate angle α and α' formed between the sprinkler ports 1302 and the vertical reference line. The angle α and α' can be between about 30 and about 60 degrees. The angle α can vary from one sprinkler port 1302 to another. In one embodiment, the angle α and/or α' is about 45 degrees.

In one embodiment, the sprinkler ports 1302 have an inner diameter of between about 0.125 inch and about 0.375 inch. It is to be understood, however, that the use of larger and smaller diameters could be appropriate in certain instances. By way of example, a sprinkler port 1302, 1302' could have a built-in diffuser nozzle. Alternatively, sprinkler ports 1302, 1302' could have respective inner or outer tapers to act as a nozzle or diffuser as may be desired.

Figure 18:
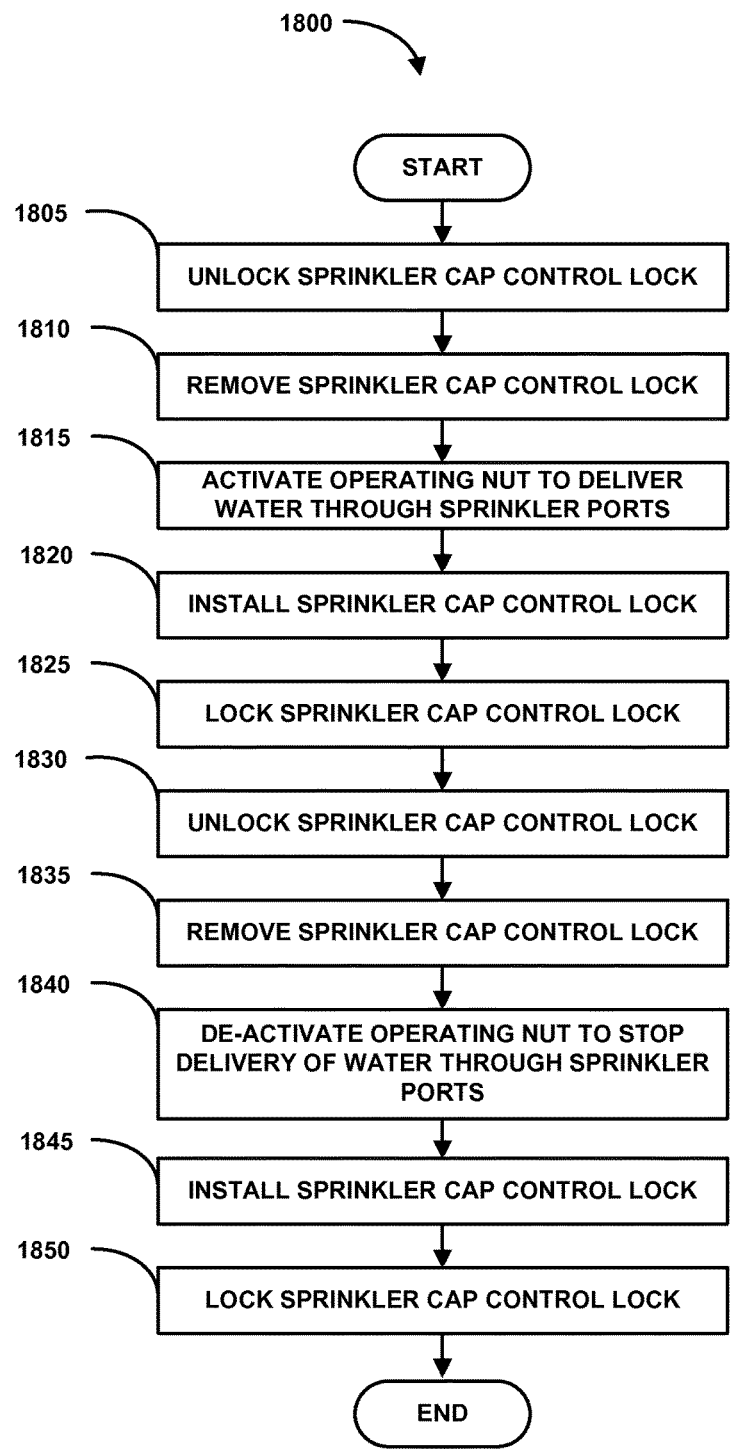
FIG. 18 is a flowchart diagram that illustrates the method operations performed in activating and deactivating the sprinkler cap, in accordance with embodiments of the present invention.

FIG. 18 is a flowchart diagram that illustrates the method operations 1800 performed in activating and deactivating the sprinkler cap, in accordance with embodiments of the present invention. The operations illustrated herein are by way of example, as it should be understood that some operations may have sub-operations and in other instances, certain operations described herein may not be included in the illustrated operations. With this in mind, the method and operations 1800 will now be described.

In an operation 1805, the sprinkler cap control lock 1310 is unlocked. In an operation 1810, the sprinkler cap control lock 1310 is removed from the tongue 106A' to provide access to the operating nut 202.

In an operation 1815, the operating nut 202 is activated to deliver water through the sprinkler ports 1302. In optional operations 1820 and 1825, the sprinkler cap control lock 1310 is reinstalled and secured the tongue 106A'. This prevents unauthorized access to the operating nut 202 while the sprinkler cap 106' is delivering water through the sprinkler ports 1302.

If the sprinkler cap control lock 1310 was reinstalled after the operating nut was activated, then in an operation 1835, the sprinkler cap control lock 1310 is unlocked and in an operation 1810, the sprinkler cap control lock 1310 is removed from the tongue 106A' to again provide access to the operating nut 202.

In an operation 1840, the operating nut 202 is de-activated to stop delivery of water through the sprinkler ports 1302. In operations 1845 and 1850, the sprinkler cap control lock 1310 is reinstalled and secured to the tongue 106A'. This prevents unauthorized access to the operating nut 202. In the method operations can end.

Lubrication Access

Figure 19A:
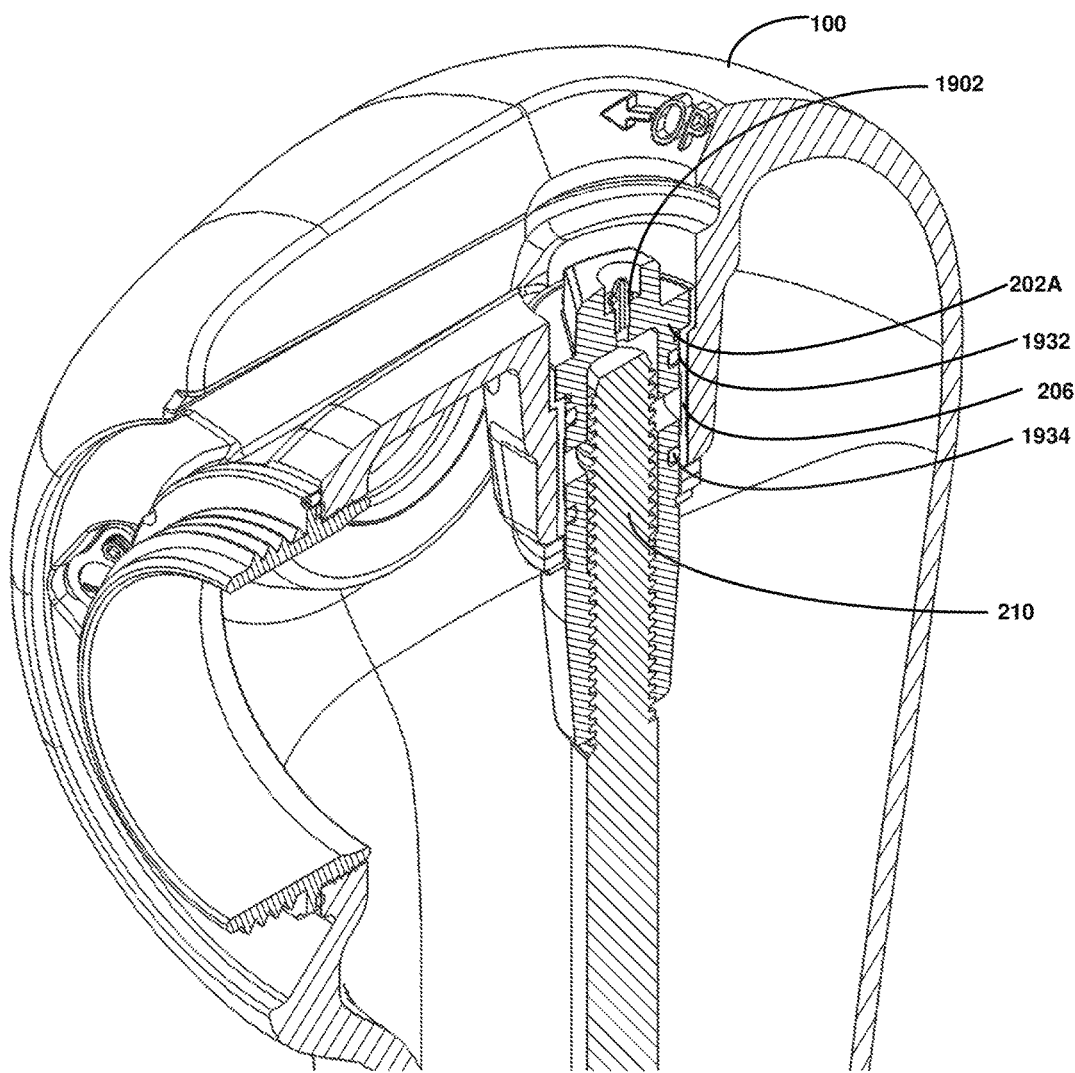
FIGS. 19A and 19B are simplified sectional view schematic diagrams of the fire hydrant in accordance with embodiments of the present invention.
Figure 19B:
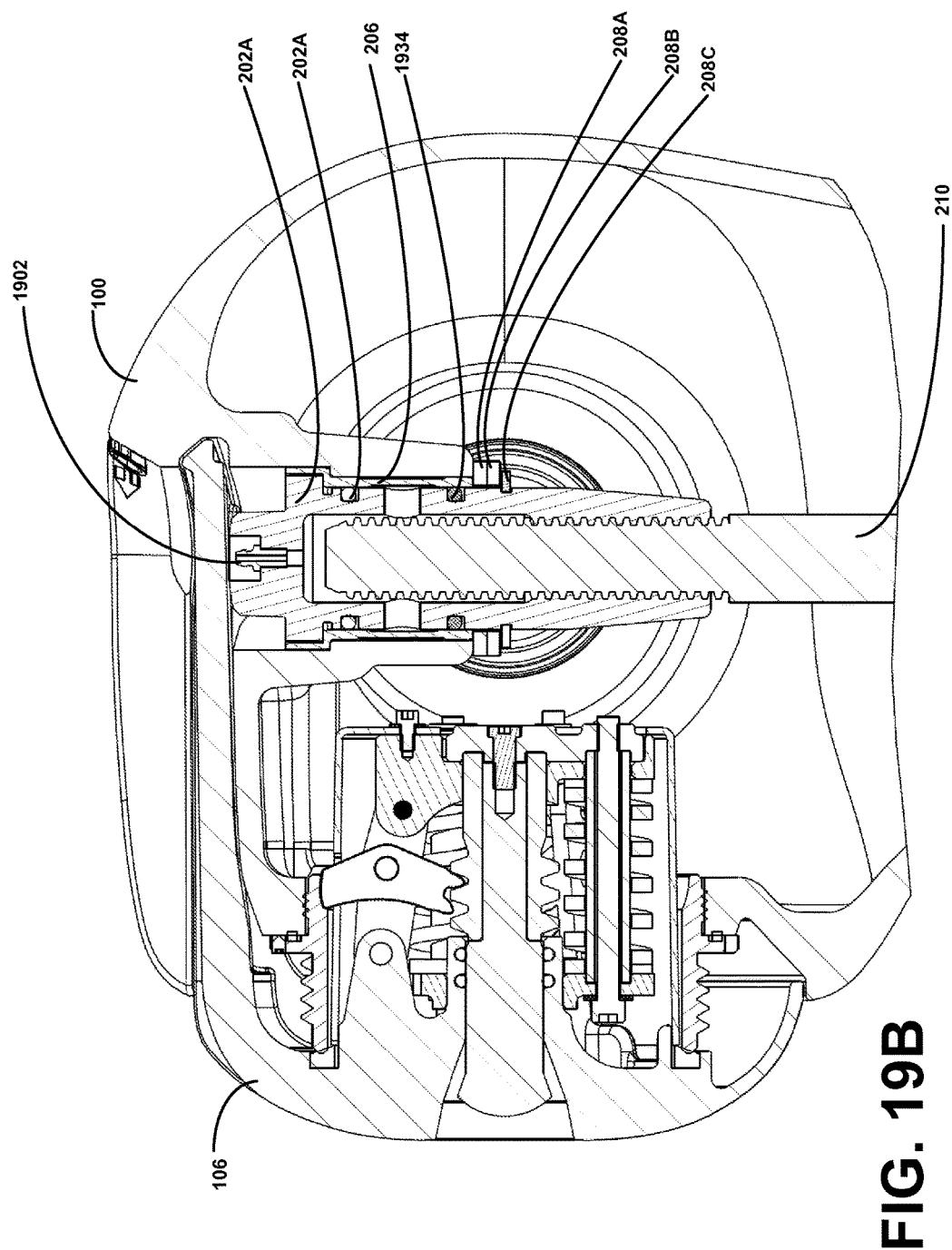

FIGS. 19A and 19B are simplified sectional view schematic diagrams of the fire hydrant 100 in accordance with embodiments of the present invention. The operating nut 202A includes a lubricant port 1902. The operating nut 202A is mechanically coupled to the operating stem 210. As shown the mechanical coupling is threads but it should be understood that the operating nut can be coupled to the operating stem with pins or other to the types of fasteners.

Figure 20:
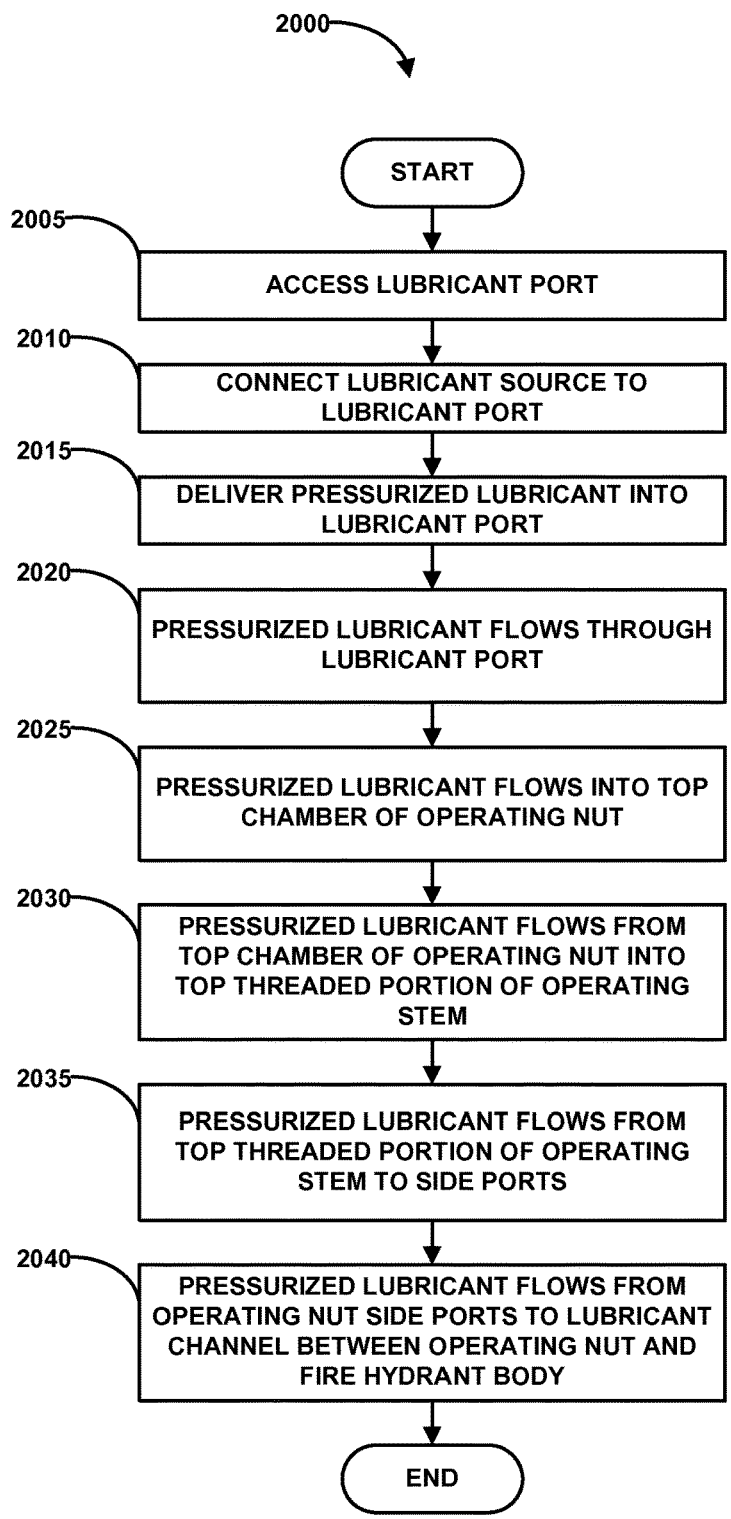
FIG. 20 is a flowchart diagram that illustrates the method operations performed in the progression of the lubricant through the operating nut, in accordance with embodiments of the present invention.

FIGS. 19C through 19F are detailed cross-sectional views of the operating nut 202A, in accordance with embodiments of the present invention. FIGS. 19C through 19F show a progression of the lubricant through the operating nut 202A. FIG. 20 is a flowchart diagram that illustrates the method operations 2000 performed in the progression of the lubricant through the operating nut 202A, in accordance with embodiments of the present invention. The operations illustrated herein are by way of example, as it should be understood that some operations may have sub-operations and in other instances, certain operations described herein may not be included in the illustrated operations. With this in mind, the method and operations 2000 will now be described.

In operation 2005, the lubricant port 1902 is accessed. This may require removing one or more access points for the locking cap 106 as described elsewhere within the application. By way of example, the locking cap 106 can be removed to access the lubricant port 1902 in the operating nut. 202A. In another example, the sprinkler cap control lock 310, 310A, if present, can be removed to access the lubricant port 1902 in the operating nut. 202A.

In operation 2010, the lubricant source 1910 is connected to lubricant port 1902. Important to note that while the lubricant port 1902 is shown as a substantially what standard grease fitting this is merely an exemplary embodiment and any suitable type of lubricant port could be utilized. The lubricant port 1902 can also include a check valve mechanism. The check valve mechanism allows a lubricant to flow into the lubricant port 1902 but does not allow the lubricant to flow in a reverse flow direction from the lubricant port.

In an operation 2015, the lubricant 1912 is pressurized and thus delivered into the lubricant port 1902. In an operation 2020, the pressurized lubricant 1914 flows through the lubricant port 1902 and into the top chamber 1904 of the operating nut 202A, in an operation 2025. The top chamber 1904 of the operating nut 202A forms a housing around the end of the operating stem 210. It should be noted that in the embodiment shown, the top chamber 1904 is not threaded on the operating stem 210 and that a relatively small space or gap 1906 remains between the threads of the operating stem and the wall of the top chamber. In other embodiments, one or more channels or grooves can be provided in the operating nut 202A or the operating stem 210 or both, for communicating the lubricant from the top chamber 1904 to one or more side ports 1908.

In an operation 2030, the pressurized lubricant 1916 flows from the top chamber 1904 through the relatively small space or gap 1906 to the one or more side ports 1908 in the operating nut 202A, in an operation 2035.

In an operation 2040, the pressurized lubricant 1919 flows into a lubricant channel 1909 between the operating nut 202A and the operating nut sleeve 206 in the fire hydrant 100. Seals 1932 and 1934 form respective upper boundary and lower boundary, to the lubricant channel 1909 between the operating nut 202A and the operating nut sleeve 206, and the method operations can end. It should be understood that the operating nut sleeve 206 is an optional component and the lubricant channel 1909 can be formed between the fire hydrant body 100 and the operating nut 202A.

The seals 1932 and 1934 can be o-rings or other suitable sealing mechanisms (e.g., compressible packing, grease or wax type seals and combinations thereof). The seals 1932 and 1934 can fit in corresponding grooves in the operating nut 202A and/or the operating nut sleeve 206. The seals 1932 and 1934 can be moved from the positions illustrated. By way of example, the top seal 1932 can be moved to near the top of the operating nut in one or more alternate locations 1932A, 1932B. Similarly, the lower seal 1934 can be moved to near the bottom of the operating nut in one or more alternate locations 1934A, 1934B. It should also be understood that more than two seals and/or seal types can be utilized. By way of example, tandem top seals can be provided in location 1932A (e.g., rubber dust cap) and 1932 (e.g., O-ring) and a compressible packing seal can be provided in location 1934A.

The pressurized lubricant 1919 can thus provide a lubricant film in the lubricant channel 1909 between the operating nut 202A the operating nut sleeve 206. This lubricant film substantially prevents water from entering the lubricant channel 1909. Thus substantially preventing the operating nut 202A from seizing, binding or corroding in the operating nut sleeve 206. As a result the operating nut 202A is more likely to remain operational (e.g., remain able to rotate and thus operate the operating stem 210) through various severe conditions such as freezing, pressurized water, hot and cold climates etc.

Hydrant Valve Seals

FIG. 21 is a perspective view of the valve top plate 230, in accordance with embodiments of the invention. The valve top plate 230 has a substantially conical base 402 having an angle α of between about 20 degrees and about 60 degrees between the surface of the conical base and the substantially flat bottom surface 404 of the valve top plate 230 (see FIG. 4E).

The valve top plate 230 can include three substantially equally spaced stabilizer arms 406 as shown in FIG. 21. It should be understood that the valve top plate 230 can include two, three, four or more stabilizer arms 406 and the three stabilizer arms represent only an exemplary embodiment and should not be viewed as being restrictive to only embodiments having three stabilizer arms.

The three stabilizer arms 406 can be spaced at angle ß of between about 90 degrees and about 135 degrees between the respective centerlines of the stabilizer arms (see FIG. 4B). It should be understood that while the valve top plate 230 is shown and described with three stabilizer arms, more than three (e.g., four or five or more) stabilizer arms could be included.

The stabilizer arms 406 have a substantially flat outer surface 408. The outer surfaces 408 fit into slots 502 of the valve seat ring 222 as will be described in more detail below. The stabilizer arms 406 have a substantially triangular cross section shape having an inner angle Ω that is opposite to the outer surfaces 408 (see FIG. 4B). The inner angle Ω is between about 20 degrees and about 45 degrees.

The valve top plate 230 includes replaceable inserts 228 installed on the outer surfaces 408 of the stabilizer arms 406 (see FIGS. 21 and 4E). The replaceable inserts 228 can be secured to the outer surfaces 408 with fasteners 226. The outer surfaces 408 can include recesses 408A that substantially surround the replaceable inserts 228 on one or more sides of the replaceable inserts.

The replaceable inserts 228 can be formed of a flexible and/or compressible resilient material. An exemplary resilient material is able to recoil or spring back into shape after bending, stretching, or being compressed. Exemplary flexible and/or compressible resilient materials include Delrin (i.e., acetal polyoxymethylene copolymer (POM)), polyethylene oxide, poly-dimethyl acetal resin, ultra-high-molecular-weight polyethylene (UHMW) (e.g., a polyolefin with polymer chains having a parallel orientation of about 90% and a level of crystallinity of up to 90 percent) and other suitable flexible and/or compressible resilient materials.

When the operating stem 220 moves in direction 942B which also moves the valve control device 200 in direction 942B to a closed position, the valve top plate 230 fully uncovers the drain holes 504 in the valve seat ring 222. Uncovering the drain holes 504 in the valve seat ring 222 allows water in the standpipe 195 to drain from the standpipe and out a 902. By way of example, the water flows out the drain holes 504 and the drain ports 806 in the drain ring 198 and the notches 704, outlet notches 706 and drain channel 710 in the saturation ring 199, thus draining the standpipe 195.

When the operating stem 220 moves in direction 942A which also moves the valve control device 200 in direction 942A to an open position, the valve top plate 230 fully covers the drain holes 504 in the valve seat ring 222 and the water from the inlet elbow 300 pressurizes the standpipe 195. Covering the drain holes 504 in the valve seat ring 222 prevents water in the standpipe 195 from draining from the standpipe. Thus more water is delivered to the fire hydrant user and less water is wasted.

Similarly, when the operating stem 220 moves in direction 942B which also moves the valve control device 200 in direction 942B to a closed position (e.g., closes the gap between the seat valve seal 234 and the valve seat 510 in the valve seat ring 222.

The seat valve seal 234 is formed of a flexible and/or compressible resilient material and can therefore be somewhat deformed as it seats in the valve seat 510 thus forming a very tight seal. Thus preventing leakage of pressurized water from the inlet elbow 300 to the standpipe 195.

Typically, if water leaks across the valve seat 510, the standpipe 195 can become pressurized. A pressurized standpipe 195 can prevent the locking cap 106 and/or the side caps 108A and 108B from being removed from the fire hydrant body 100. Exemplary flexible and/or compressible resilient materials include Delrin (i.e., acetal polyoxymethylene copolymer (POM)), polyethylene oxide, poly-dimethyl acetal resin, ultra-high-molecular-weight polyethylene (UHMW) (e.g., a polyolefin with polymer chains having a parallel orientation of about 90% and a level of crystallinity of up to 90 percent) and other suitable flexible and/or compressible resilient materials.

In summary, the present invention provides a valve control device for fire hydrant that includes, among other features, an improved flow system through the valve control device and an improved standpipe drain system. The invention has been described herein in terms of several exemplary embodiments. Other embodiments of the invention will be apparent to those skilled in the art from consideration of the specification and practice of the invention. The embodiments and preferred features described above should be considered exemplary, with the invention being defined by the appended claims and equivalents thereof.

What is claimed is:

1. A fire hydrant comprising:
   a fire hydrant body;
   an operating nut coupled to an operating stem, the operating nut including:
      a lubricant port centrally disposed in a top of the operating nut;
      a top chamber forming a housing around an end of the operating stem, the housing defined between an interior surface of the operating nut and the end of the operating stem, the top chamber having a non-threaded portion extending past a first portion of a plurality of threads on the operating stem such that a gap remains between an interior surface of the top chamber and the first portion of the plurality threads on the operating stem; and
      one or more side ports in fluid communication with the top chamber and a lubricant channel between the operating nut and the fire hydrant body;
   a first seal and a second seal between the operating nut and the fire hydrant body, the first seal defining an upper boundary to the lubricant channel and the second seal defining a lower boundary to the lubricant channel; and
   a locking cap mounted on the fire hydrant body, a portion of the locking cap being disposed over the operating nut such that the locking cap prevents access to the lubricant port in the operating nut.

2. The fire hydrant of claim 1, further comprising an operating nut sleeve between the operating nut and the fire hydrant body.

3. The fire hydrant of claim 2, wherein the operating nut sleeve is formed from a resilient material from one of a group consisting of an acetal polyoxymethylene copolymer, a polyethylene oxide, a poly-dimethyl acetal resin, and an ultra-high-molecular-weight polyethylene.

4. The fire hydrant of claim 1, wherein the top chamber includes at least one channel formed in the operating nut, the at least one channel extending from a top end of the operating stem to at least one of the side ports.

5. The fire hydrant of claim 1, wherein the fire hydrant body includes:
   a head that defines a hollow interior, the head including:
      a main outlet port;
      an auxiliary outlet port; and
      a valve access hole,
      an outer surface of the head being configured to define a main cap recess that surrounds the main outlet port, an auxiliary cap recess that surrounds the auxiliary outlet port, and a valve access channel that extends between the main cap recess and the valve access hole, and the head further having an internal channel defined therein, the internal channel extending between the main cap recess and the auxiliary cap recess, a plunger assembly being disposed within the internal channel such that the locking cap installed on the main outlet port compresses the plunger assembly into the internal channel to cause the plunger assembly to extend into the auxiliary cap recess and thereby engage a latching mechanism in an auxiliary cap installed in the auxiliary access port.

6. The fire hydrant of claim 5, wherein the plunger assembly includes first and second plungers moveably disposed within a sleeve, the first plunger being disposed such that an end thereof is capable of extending into the main cap recess and wherein the locking cap compresses the end of the first plunger into the internal channel, the first plunger being coupled to and displacing the second plunger in the internal channel such that an end of the second plunger is capable of extending into the auxiliary cap recess.

7. The fire hydrant of claim 5, wherein the latching mechanism in the auxiliary cap includes a plurality of ratchet teeth.

8. The fire hydrant of claim 5, wherein the locking cap includes a tongue that extends over the operating nut.

9. The fire hydrant of claim 8, further comprising a sprinkler cap control lock disposed in the tongue of the locking cap, the sprinkler cap control lock securing access to the operating nut.

10. A fire hydrant comprising:
    a fire hydrant body;
    an operating nut coupled to an operating stem, the operating nut including:
       a lubricant port centrally disposed in a top of the operating nut;
       a top chamber forming a housing around an end of the operating stem, the housing defined between an interior surface of the operating nut and the end of the operating stem, the top chamber having a non-threaded portion extending past a first portion of a plurality of threads on the operating stem such that a gap remains between an interior surface of the top chamber and the first portion of the plurality threads on the operating stem; and
       one or more side ports in fluid communication with the top chamber and a lubricant channel between the operating nut and the fire hydrant body;
    an operating nut sleeve disposed between the operating nut and the fire hydrant body, wherein the operating nut sleeve is formed from a resilient material from one of a group consisting of an acetal polyoxymethylene copolymer, a polyethylene oxide, a poly-dimethyl acetal resin, and an ultra-high-molecular-weight polyethylene, the operating nut sleeve acting as a lubricant between the operating nut and the fire hydrant body, wherein at least one of the side ports forms a fluid communication channel to the operating nut sleeve to provide lubricant from the top chamber to the operating nut sleeve; and
    a locking cap mounted on the fire hydrant body, a portion of the locking cap being disposed over the operating nut such that the locking cap prevents access to the lubricant port in the operating nut.

11. The fire hydrant of claim 10, wherein the top chamber includes at least one channel formed in the operating nut, the at least one channel extending from a top end of the operating stem to at least one of the side ports.

12. The fire hydrant of claim 10, wherein the fire hydrant body includes:
a head that defines a hollow interior, the head including:
a main outlet port;
an auxiliary outlet port; and
a valve access hole,
an outer surface of the head being configured to define a main cap recess that surrounds the main outlet port, an auxiliary cap recess that surrounds the auxiliary outlet port, and a valve access channel that extends between the main cap recess and the valve access hole, and the head further having an internal channel defined therein, the internal channel extending between the main cap recess and the auxiliary cap recess, a plunger assembly being disposed within the internal channel such that the locking cap installed on the main outlet port compresses the plunger assembly into the internal channel to cause the plunger assembly to extend into the auxiliary cap recess and thereby engage a latching mechanism in an auxiliary cap installed in the auxiliary access port.

13. The fire hydrant of claim 12, wherein the plunger assembly includes first and second plungers moveably disposed within a sleeve, the first plunger being disposed such that an end thereof is capable of extending into the main cap recess and wherein the locking cap compresses the end of the first plunger into the internal channel, the first plunger being coupled to and displacing the second plunger in the internal channel such that an end of the second plunger is capable of extending into the auxiliary cap recess.

14. The fire hydrant of claim 12, wherein the latching mechanism in the auxiliary cap includes a plurality of ratchet teeth.

15. The fire hydrant of claim 12, wherein the locking cap includes a tongue that extends over the operating nut.

16. The fire hydrant of claim 15, further comprising a sprinkler cap control lock disposed in the tongue of the locking cap, the sprinkler cap control lock securing access to the operating nut.

17. A fire hydrant comprising:
a fire hydrant body having a head that defines a hollow interior, the head including:
a main outlet port;
an auxiliary outlet port; and
a valve access hole,
an outer surface of the head being configured to define a main cap recess that surrounds the main outlet port, an auxiliary cap recess that surrounds the auxiliary outlet port, and a valve access channel that extends between the main cap recess and the valve access hole, and the head further having an internal channel defined therein, the internal channel extending between the main cap recess and the auxiliary cap recess, a plunger assembly being disposed within the internal channel such that the locking cap installed on the main outlet port compresses the plunger assembly into the internal channel to cause the plunger assembly to extend into the auxiliary cap recess and thereby engage a latching mechanism in an auxiliary cap installed in the auxiliary access port;
an operating nut coupled to an operating stem, the operating nut including:
a lubricant port centrally disposed in a top of the operating nut;
a top chamber forming a housing around an end of the operating stem, the housing defined between an interior surface of the operating nut and the end of the operating stem, the top chamber having a non-threaded portion extending past a first portion of a plurality of threads on the operating stem such that a gap remains between an interior surface of the top chamber and the first portion of the plurality threads on the operating stem; and
one or more side ports in fluid communication with the top chamber and a lubricant channel between the operating nut and the fire hydrant body; and
a locking cap mounted on the fire hydrant body, a portion of the locking cap being disposed over the operating nut such that the locking cap prevents access to the lubricant port in the operating nut.

18. The fire hydrant of claim 17, wherein the plunger assembly includes first and second plungers moveably disposed within a sleeve, the first plunger being disposed such that an end thereof is capable of extending into the main cap recess and wherein the locking cap compresses the end of the first plunger into the internal channel, the first plunger being coupled to and displacing the second plunger in the internal channel such that an end of the second plunger is capable of extending into the auxiliary cap recess.

19. The fire hydrant of claim 17, wherein the latching mechanism in the auxiliary cap includes a plurality of ratchet teeth.

20. The fire hydrant of claim 17, wherein the locking cap includes a tongue that extends over the operating nut.

21. The fire hydrant of claim 20, further comprising a sprinkler cap control lock disposed in the tongue of the locking cap, the sprinkler cap control lock securing access to the operating nut.

* * * * *